United States Patent [19]
Cherry et al.

[11] Patent Number: 5,487,622
[45] Date of Patent: Jan. 30, 1996

[54] SYSTEM FOR TREATING POLLUTED GROUNDWATER

[75] Inventors: John A. Cherry; Enoch S. Vales, both of Waterloo; Robert W. Gillham, Guelph, all of Canada

[73] Assignee: University of Waterloo, Waterloo, Canada

[21] Appl. No.: 331,535

[22] PCT Filed: Apr. 23, 1993

[86] PCT No.: PCT/GB93/00860

§ 371 Date: Oct. 20, 1994

§ 102(e) Date: Oct. 20, 1994

[87] PCT Pub. No.: WO93/22241

PCT Pub. Date: Nov. 11, 1993

[30] Foreign Application Priority Data

Apr. 23, 1992 [GB] United Kingdom ............ 9208822

[51] Int. Cl.⁶ ............ C02F 1/00; E02D 19/18; E02D 5/06
[52] U.S. Cl. ............ 405/128; 405/267; 405/278; 588/249
[58] Field of Search ............ 405/128, 267, 405/266, 276, 278, 283, 249; 588/248, 249

[56] References Cited

U.S. PATENT DOCUMENTS

| | | | |
|---|---|---|---|
| 4,877,357 | 10/1989 | Verstraeten | 405/267 |
| 5,054,961 | 10/1991 | Sherman | 405/128 |
| 5,057,227 | 10/1991 | Cohen | 210/680 |
| 5,106,233 | 4/1992 | Breaux | 405/267 X |
| 5,132,021 | 7/1992 | Alexander | 405/128 |
| 5,240,348 | 8/1993 | Breaux | 405/267 X |
| 5,354,149 | 10/1994 | Breaux | 405/267 X |

FOREIGN PATENT DOCUMENTS

| | | |
|---|---|---|
| 0186921 | 7/1986 | European Pat. Off. . |
| 2185901 | 8/1987 | United Kingdom . |
| WO91/08176 | 6/1991 | WIPO . |
| WO93/04237 | 3/1993 | WIPO . |

Primary Examiner—Stephen J. Novosad
Attorney, Agent, or Firm—Anthony Asquith & Co.

[57] ABSTRACT

Contaminated groundwater is treated in-situ, by funnelling the water through a gate or gates (23) in a watertight in-ground wall (18). Treatment material in the gate (23) breaks down the contaminant, or otherwise removes the contaminant from the flowing water. A removable caisson is first driven into the ground, excavated, and then a receptacle, for the treatment material, is lowered into the hollow interior.

22 Claims, 17 Drawing Sheets

SYSTEM FOR TREATING POLLUTED GROUNDWATER

This invention relates to a system for treating contaminated groundwater.

BACKGROUND TO THE INVENTION

One of the difficulties in conventional systems for treating contaminated groundwater arises from the fact that taking water out of the ground for treatment is expensive. From the cost point of view, it is highly desirable that the groundwater be treated in-situ, ie while remaining in the ground.

It has been proposed to place treatment material in the ground, the material being inserted into a trench which has been excavated in the path of a plume of contaminant. The nature of the treatment material of course depends on the nature of the contaminant. An example is described in WO-91/08176, published 13 Jun. 91, in which the contaminant is an halogenated hydrocarbon, and the treatment material is iron. The iron is in the form of iron filings, which are placed in a trench excavated down into the material of the aquifer in the path of the velocity of the halogenated hydrocarbon contaminant plume.

When groundwater water is treated in-stiu or in-ground, many of the expenses of above-ground treatment, such as the expense of disposing of the treated water, can be avoided. Inexpensive though in-ground treatement usually is, however, still, in practice, it can be difficult and expensive actually to provide a trench of the required depth and extent in the material of the aquifer.

Aquifer materials often include large proportions of sand and gravel. One of the difficulties in providing a trench lies in the fact that such materials have little structural cohesion. In fact, sand/gravel material is especially unable to support itself when saturated with groundwater, ie below the water table, which is where an in-situ treatment system is particularly required to operate. It may be regarded that saturated sand/gravel aquifer material, from the standpoint of excavating a trench, has hardly any more ability to support itself than if it were a liquid.

One conventional manner for providing trenches in an aquifer material is to insert a pair of barriers, made of sheet metal, and inserted by pile-driving, down into the material of the aquifer. The two barriers are disposed in a spaced, parallel relationship. After the barriers are in place, the aquifer material is then extracted from between the barriers. Treatment material (eg iron filings) is inserted between the barriers, and replaces the sand/gravel that has been extracted. The two barriers are removed once the treatment material is in place.

The treatment material in the trench thus acts as a curtain through which the contaminated groundwater passes. The contaminant undergoes treatment—preferably chemical or microbiological breakdown—in passing through the treatment material. As such, of course the treatment material must be permeable.

The velocity with which groundwater travels in an aquifer of course varies a great deal from place to place, and from time to time, but velocities of the order of a few cm, or a few tens of cm, per day are typical. If the trench is say 1 meter wide, the groundwater has a residence time in the trench of perhaps a few hours or a few days. Generally, this is ample time for the chemical breakdown of the contaminant to occur, and for the breakdown reactions to be fully completed.

However, many treatment materials are themselves expensive. It can be desirable therefore to mix the treatment material with a less expensive material, and preferably a material which is chemically inert or passive with respect to the contaminant breakdown reaction. One material that might be used, for instance, is the sand/gravel that has been taken out of the trench.

It should be noted that it is difficult to make a trench of less than about a meter in width; on the other hand, however, even if it were possible practically to construct narrower trenches, a wide trench is preferred in order that the residence time be kept high.

In summary, one of the conventional ways of preparing a trench is this: pile-drive two parallel barriers; extract the material from between the barriers; form a mixture of the treatment material with the just-extracted material; insert this mixture into the space between the barriers; and then remove the barriers from the ground.

Although cheap compared with taking the water out of the ground, this procedure can still be expensive. The procedure must also be regarded as inefficient: even if the treatment material comprises only say 5% of the mixture inserted into the trench, the whole of the volume of the trench nevertheless had to be excavated. The inefficiency arises because much, or most, of the sand/gravel extracted from the trench is put straight back.

The present invention is aimed at providing a system whereby the plume of contaminated groundwater is caused to pass through a curtain of treatment material, but the manner of placing the treatment material in the aquifer, in the path of the plume, is carried out much more economically and efficiently than has been the case with the conventional systems.

The invention is aimed at providing a system whereby the plume of contaminated groundwater is caused to pass through a curtain of treatment material, but the manner of placing the treatment material in the aquifer, in the path of the plume, is carried out much more economically and efficiently than has been the case with the conventional systems.

The invention is aimed at providing a system for in-ground treatment of contaminated groundwater. As in the "trench" system, the contaminated groundwater is passed through a body of treatment material. The system of the invention provides a watertight wall, with gates. Receptacles for the treatment material are provided in the gates. The watertight barrier may be formed from sealable pile-driven elements, and the receptacle formed from an enclosure made from pile-driven elements and linked by waterproof junctions to the barrier.

The barrier should be watertight, apart from the gates: that is to say, no water should be allowed to emerge through the barrier unless that water has passed through the treatment material.

(In this specification, the term "watertight" is intended to be construed in the sense of "substantially watertight". That is to say, insofar as a particular barrier may permit some leakage, that the barrier is watertight, as that term is used herein, if the amount of the leakage is negligible in the context of the operation of cleaning up the contaminted groundwater. If the nature of the pollutant is such that absolutely no trace of the pollutant can be permitted to escape, then the barrier must be absolutely watertight. If, as is more usual, the pollutant can in fact be permitted to be present up to some threshold concentration, then the barrier is watertight, as that term is used herein, if the barrier permits only so little leakage as to enable that threshold requirement to be met.)

There are other types of walls which may be classed as watertight, and the invention may be used in connection with such walls. Examples of watertight in-ground wall structures include: interlocking plastic sheet walls; concrete column walls; soil-bentonite slurry walls and other types of impervious slurry walls; concrete panel walls; vibrated beam bentonite or cement walls; auger mix walls; jet grout walls; and the like.

An aim of the treatment system of the invention is to provide a system in which different in-ground components of the treatment system can be joined together quickly, cheaply, and reliably. A particular aim of the invention is to provide a system in which a watertight wall is joined to a gate, and the junction between them is also watertight.

It is an aim of the invention also to provide a treatment system in which only a single type of (heavy) technology is required for its installation. It is recognised that it is desirable to avoid a system in which, for example, heavy excavation equipment had to be provided at the site, and in addition, heavy concrete insertion machinery was also needed for other phases of installation. It is an aim of the invention to provide a treatment system in which, where the watertight wall is of sealable pile-driven elements, the receptacles can be installed wholly by pile-driving. This is not to say that other technologies are ruled out in the invention; but such other activities as extracting spoil from an enclosed receptacle, for example, require only light equipment to be brought to the site, as compared with the equipment needed, for example, to excavate a trench.

The invention makes use of watertight barriers. It is conventional for such barriers to be made of sheet steel elements, and to be pile-driven into the ground. Watertight barriers are also known, in which a separate massive structure is first hammered into the ground, and then a comparatively light sheet is inserted into the cavity created thereby. It is also known for the sheets of in-ground barriers to be made of plastic.

The invention is concerned with a waterproof barrier provided with gates in which are placed receptacles of treatment material, and with the manner by which such gates are joined in a watertight fashion to the watertight wall. As such, the invention is applicable to other watertight barrier systems, apart from the (preferred) waterproof sheet-piling barriers.

DETAILED DESCRIPTION OF PREFERRED EMBODIMENTS

By way of further explanation of the invention, exemplary embodiments of the invention will now be described with reference to the accompanying drawings, in which.

Figure 21A:
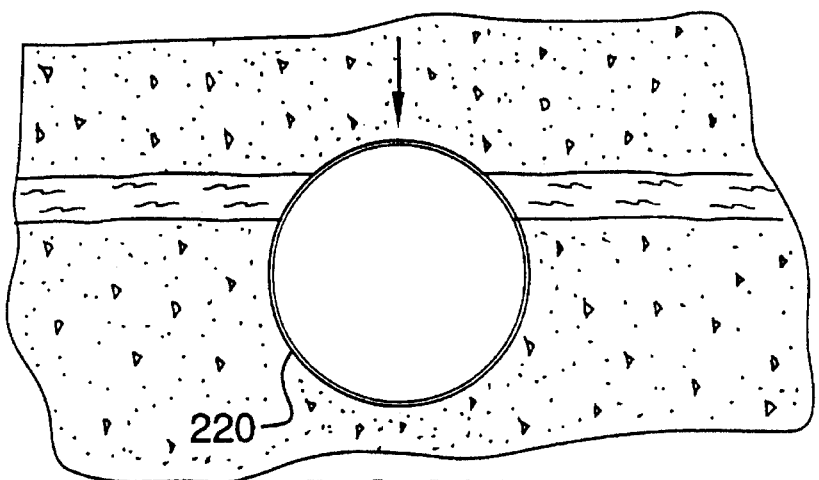
Figure 21B:
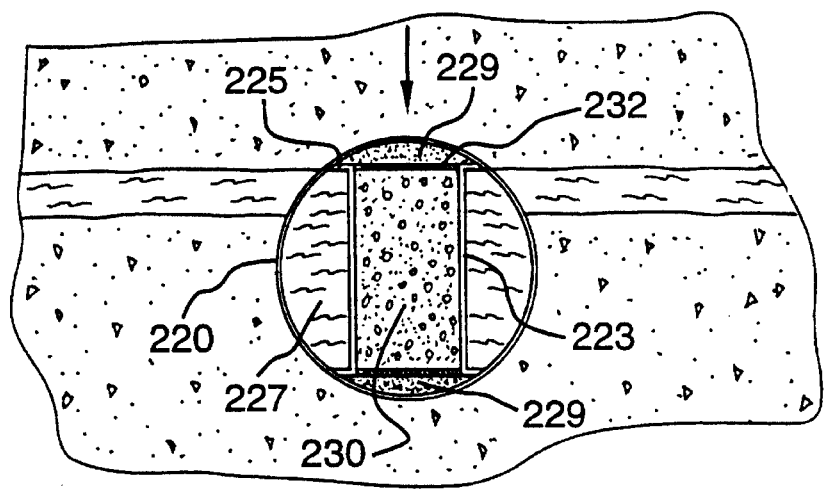
Figure 21C:
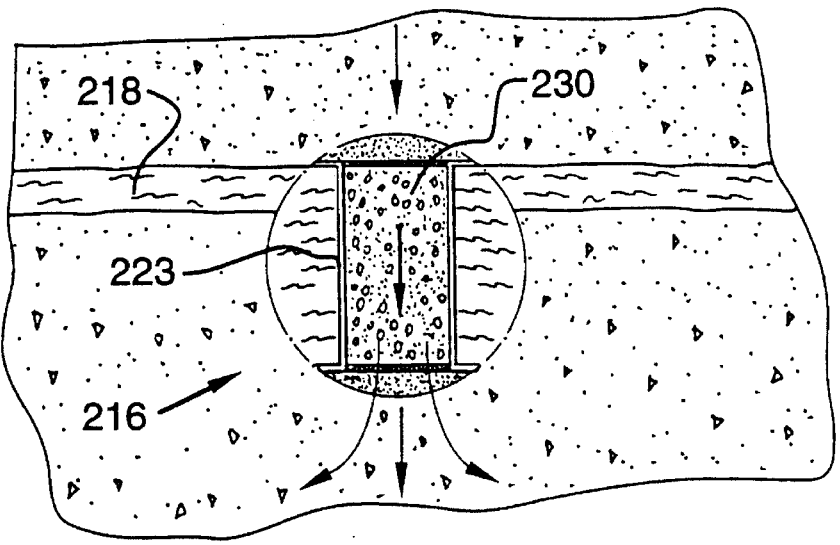

FIGS. 21A–C show three plan views of a treatment system, 21A, 21B, and 21C, showing an alternative manner of construction.

The systems shown in the accompanying drawings and described below are examples which embody the invention. It should be noted that the scope of the invention is defined by the accompanying claims, and not necessarily by specific features of exemplary embodiments.

Figure 1:
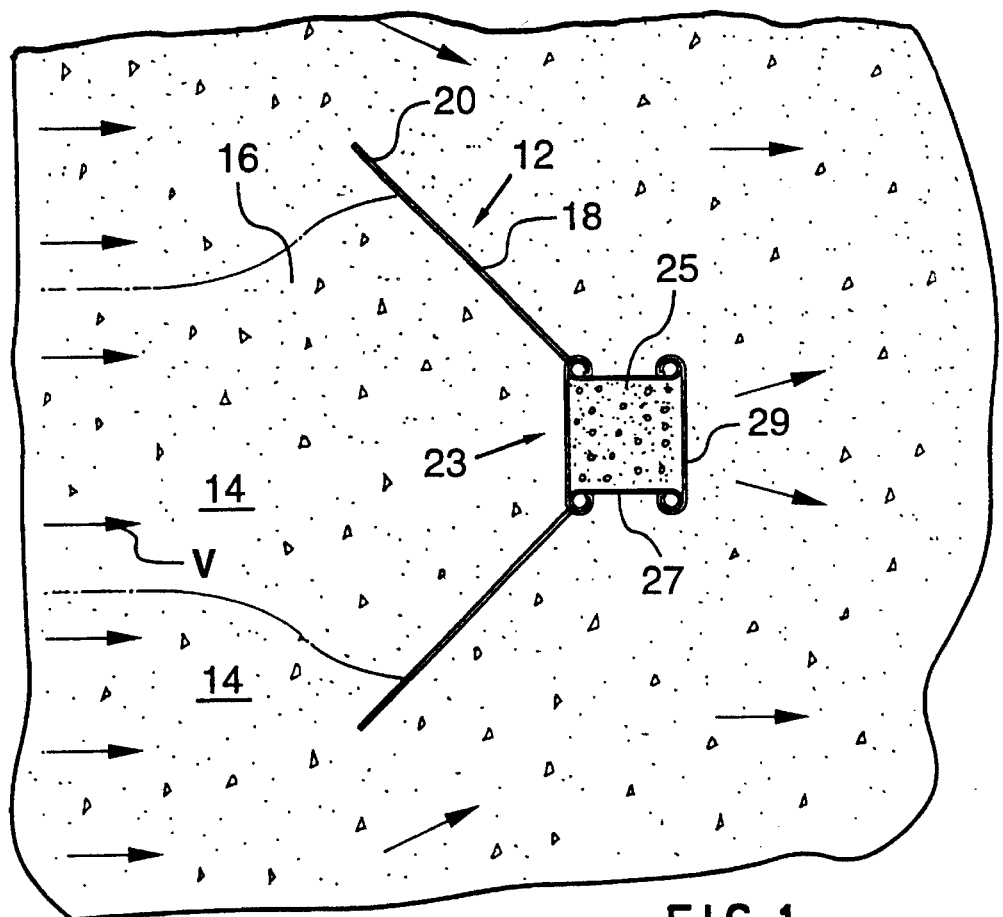
FIG. 1 is a plan view of an area of ground, in which a receptacle containing an active treatment material is provided as a gate in a waterproof in-ground wall or barrier, forming a treatment system which embodies the invention.

As shown in FIG. 1, a curtain 12 is inserted into the ground, ie into the aquifer 14, in the path of a plume 16 of a contaminant. The water containing the plume is traversing through the aquifer with a velocity V.

The invention may be used in relation to the breaking down of (liquid) contaminants of the kind that are dissolved in the ground water, the treatment being effected by causing the chemical breakdown of the contaminant. However, the invention can be applied to other contaminants, of the kind for example which are simply mixed with or suspended in the groundwater.

The invention may be used with treatment systems in which certain bacteria are used to degrade organic chemicals, and with treatment systems which use oxidation-reduction media to remove metals from water, or to remove nitrate from water. The invention may be used with treatment systems involving the use of media to cause removal of inorganic contaminants such as metals or phosphate by precipitation.

The removal of dissolved (liquid) contaminants from groundwater may take place by such processes as: abiotic dehalogenation; microbial degradation; chemical precipitation; chemical or microbial reduction; adsorption; absorption; and so on. In some cases, the contaminant may be broken down; in other cases, the contaminant may remain intact and be physically removed by being incorporated onto or into the particles that form the porous medium in the gate.

Contaminants, whether or not dissolved in the groundwater, may be hazardous when present merely in trace quantities, such as gasoline (physically mixed) or chloroform (dissolved), whilst other contaminants are hazardous only when present in bulk quantities, such as (dissolved) sulphuric acid and agricultural nitrates.

The invention can be utilised in the treatment of both trace contaminants and bulk contaminants, and in the treatment of both dissolved contaminants and physically mixed contaminants, as explained. The velocity of the molecules of the contaminant through the aquifer need not be the same as the velocity V of the molecules of groundwater. In fact, some types of contaminant, of both the mixed type and the dissolved type, can be naturally retarded by some types of aquifer, whereby the velocity of the contaminant is measurably less than the velocity of the water.

In FIG. 1, the curtain 12 includes a watertight wall 18 of metal (steel) sheets 20, which are pile-driven into the ground. The wall is watertight by virtue of the fact that the elements of the wall are formed with interlocking edge-to-edge joints, into which sealant is injected. The wall 18 is interrupted at intervals by gates 23. The gates 23 are so constructed as to allow the groundwater to pass therethrough, and hence through the curtain.

Each gate 23 contains a body 25 of treatment material, the body being sufficiently porous and permeable as to allow the flowing groundwater to pass therethrough. In the gate 23, the body 25 of treatment material is contained in a receptacle 27. The receptacle is formed as a container for containing the body of treatment material, and yet allowing the contaminated water to pass into the receptacle. For this purpose the receptacle is provided with slots 29.

Figure 2:
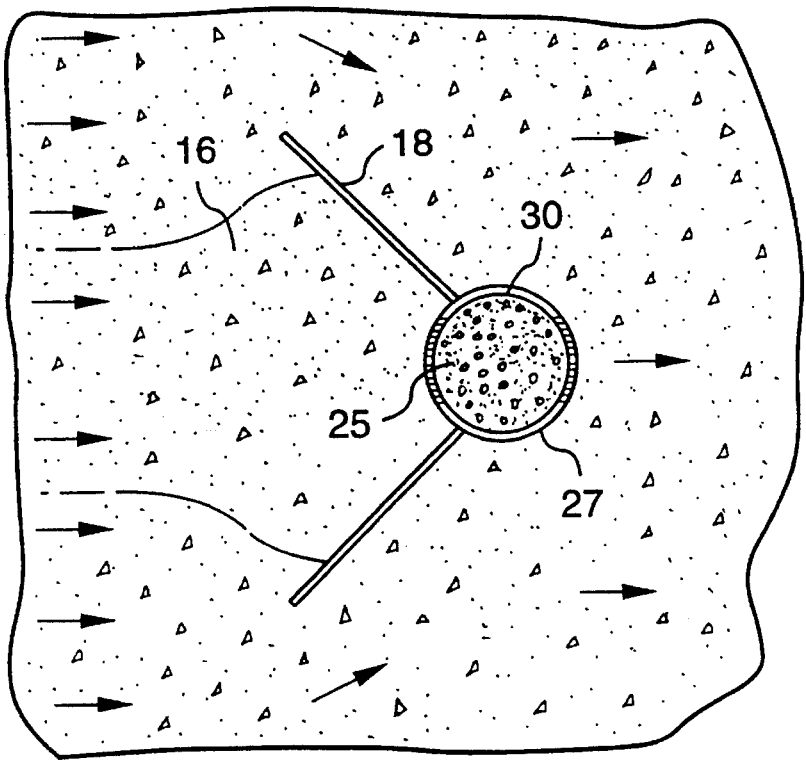
FIG. 2 is a plan corresponding to FIG. 1, in which the receptacle is of right-cylindrical form.

In the system shown in FIG. 2, the receptacle 27 comprises a right cylinder 30. The cylinder 30 is formed from suitably curved steel sheets, which are welded together into a unitary structure.

The cylinder 30 is pile-driven vertically down into the ground 14 as an integral unit. The circumference of such a cylinder typically is in the 3 to 6 meters range, the sheets of steel being of the order of 15 or 20 mm thick. As mentioned, the metal from which the cylinder is formed is provided with suitably-positioned slots 29, so that water may pass through the walls of the cylinder: of course, the designer must see to it that these slots are not such as will decrease the ability of the cylinder to be pile-driven into the aquifer.

A cylinder having the above-mentioned dimensions can be driven as an integral whole, provided the pile-driver is equipped with a suitable means for feeding the hammer blows uniformly into the walls of the cylinder. Cylinders of that size can be pile-driven to depths of at least 20 or 30 meters. Over about 6 meters in circumference, however, it becomes increasingly more practical to design the receptacle in separate pieces, which may be hammered or driven separately.

When the receptacle is not cylindrical but is, for example, rectangular, as in FIG. 1, again there is a size limit for designing the receptacle as a single piece which is driven as a unitary whole.

Once the receptacle has been driven into place, the soil and other aquifer material remaining inside the receptacle is extracted. Where the receptacle is a cylinder, the material can be extracted by means of an auger that is dimensioned to fit inside the diameter of the cylinder. If a "fitted" auger is not practical, buckets can be passed down into the receptacle to extract the material, or a clam-shell excavator may be used. It is sometimes practical also to flush the material out using jets of water. At least the lower zones in the receptacle will be below the water table; and it may be noted that sand/gravel material saturated with water offers very little resistance to being mechanically moved.

When (nearly) all the solid material has been extracted from inside the receptacle, a level of water will be present inside the receptacle, as determined by the level of the water table in the aquifer. The treatment material is then lowered into the receptacle, and settles down into the water.

The treatment material may comprise an active chemical, which is effective to cause the chemical breakdown of the contaminant. For reasons of economy, it may be preferred to mix the active chemical to be inserted into the receptacle with some cheap chemically inert material, and one suitable source of such material is the sand/gravel that has just been extracted from the receptacle. (Some jurisdictions however do not permit possibly contaminated soil that has been extracted to be replaced in the ground.)

Also, it may be desired to mix a chemically-active treatment material with a retardant, such as activated carbon, whereby the molecules of the contaminant are retarded and thereby maintained in proximity to the chemically active material for a longer period than would be the case if the retardant were not present.

The treatment material may be itself, or the mixture may include components of, the kind of material which floats in water. In this case, the material should be placed in bags (made of porous material), and the bags weighted to make them sink.

Usually, there is no need for the chemically active treatment material to occupy the zone above the water table, and in fact some treatment materials will gradually oxidise and disappear if placed above the water table. The upper zones of the receptacle therefore may be back-filled with sand/gravel, or other cheap material. The upper zones, above the water table, may even be left empty, although the receptacle then would not be physically supported inside, and would be vulnerable to collapse due to shifts in the ground. Also, an empty hole in the ground can be a hazard in itself.

Figure 3:
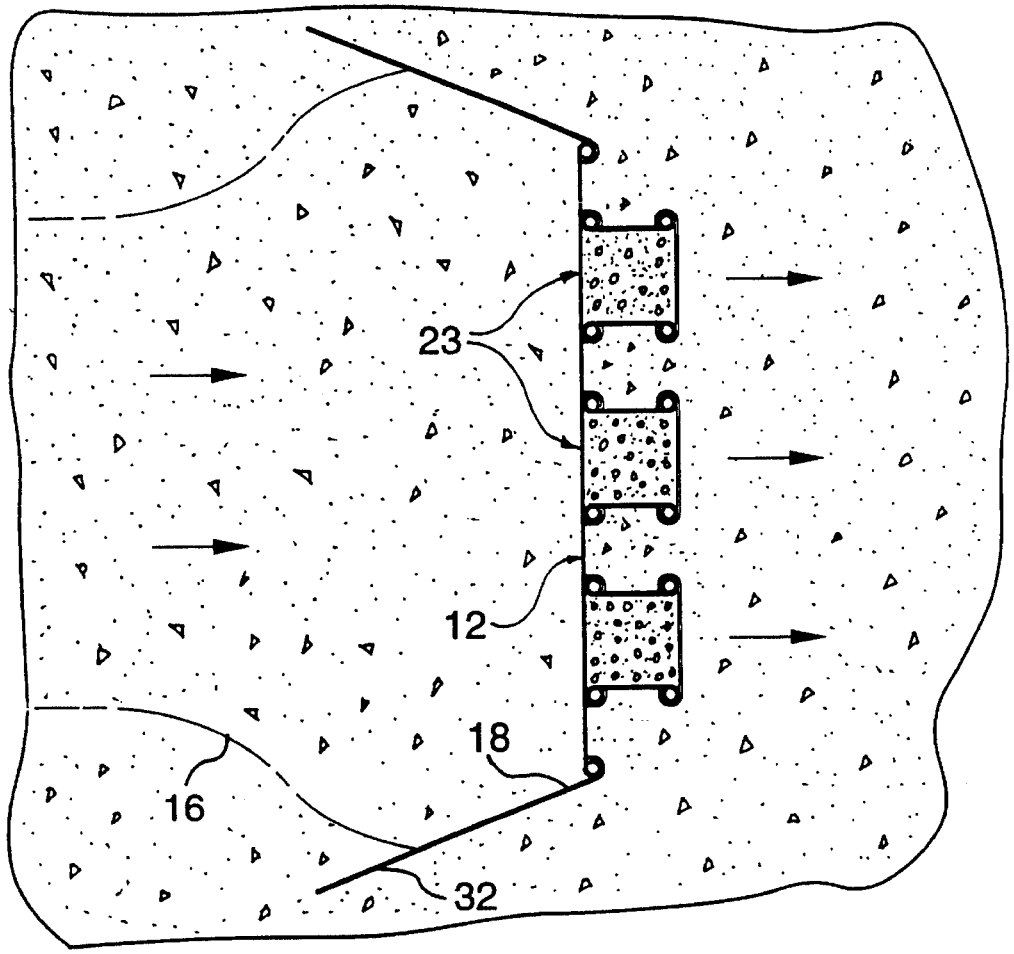
FIG. 3 is a plan corresponding to FIG. 1, in which several of the receptacles are positioned side-by-side in the wall.
Figure 4:
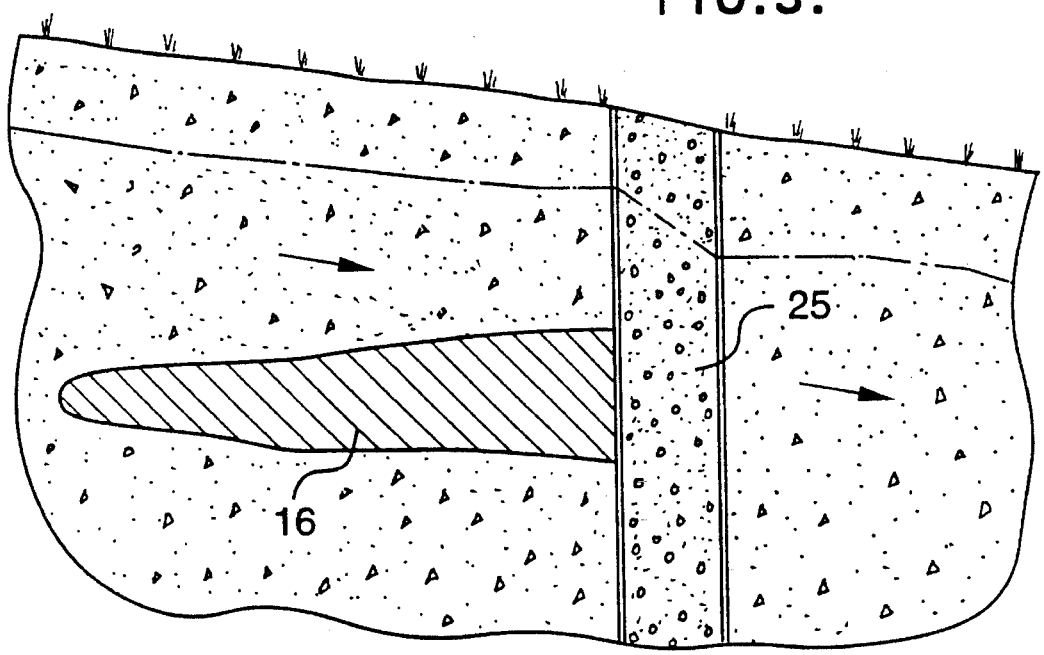
FIG. 4 is a cross-section of the ground, showing a side view of the system of FIG. 1.

A number of gates 23 may be present across the width of the curtain 12, as shown in FIG. 3. The presence of the watertight wall 18 causes an increase in the hydraulic pressure in the aquifer upstream of the wall, and therefore an increase in the height of the water table upstream of the wall. This increase is illustrated in FIG. 4. The pressure differential across the front and back of the curtain therefore is greater than the pressure differential would be across the same portion of the aquifer if the curtain were not present, and therefore the velocity of the water flowing through the gates is greater than the natural velocity of the groundwater in the aquifer. The more the water is funnelled or otherwise diverted into the gates, the greater the velocity through the gates, and the number and size of the gates should be so designed that the raised pressure head and the increased velocity can be accommodated.

On the other hand, it is the funnelling of the water through the gates that leads to the efficiencies and economies that are possible with the invention. In a typical case, the degree of funnelling may be about ten to one. The ideal ratio at a particular site would depend on the conditions at that site. Of course, the designer should see to it that the funnelling is not so marked as to constrict the flow of water and cause the water to back-up behind the barrier, whereby some of the contaminant might leak around the barrier.

As indicated (diagrammatically) in the drawings, when a (gated) curtain is provided, the contaminant plume usually tends to swell out laterally behind the curtain. The plume can also tend to swell upwards behind the curtain, due to the raised water table. The plume can even tend to swell downwards. This behaviour of the plume should be explored thoroughly before the curtain is put in place, in order to ensure that the contaminant will not by-pass the curtain. For this purpose, it will usually be appropriate to provide (watertight) wings 32 for the curtain, in order to contain the deflected contaminant, and the arrangement of the gates should be set bearing in mind the need to contain any deflections of the plume that may occur.

Figure 5:
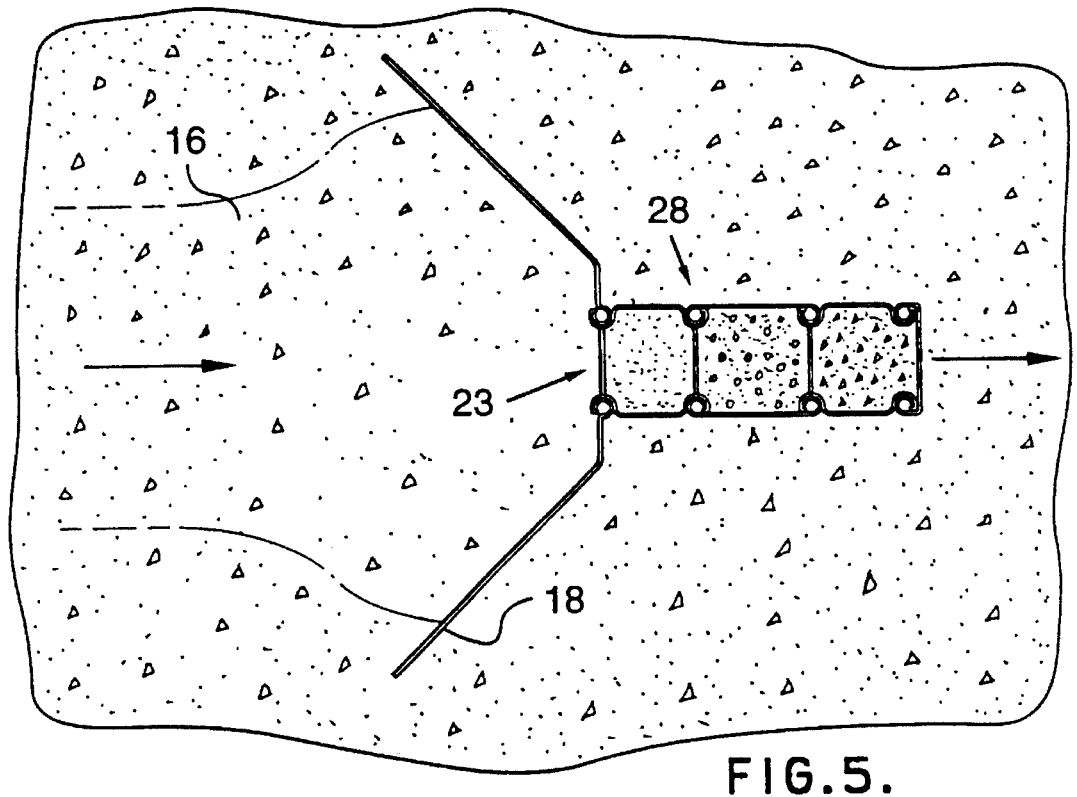
FIG. 5 is a plan corresponding to FIG. 1, in which several of the receptacles are positioned one behind the other, whereby water passing through the treatment system passes through the receptacles in series.

Depending on the nature of the contaminant, it may be preferred to treat the contaminant in a number of stages. A number of receptacles can therefore be placed in a single gate, so that the contaminated water passes through each in turn. This permits certain kinds of treatment to be carried out which would be impractical if the treatment material had to be mixed together. Also, it may be required to filter out solids from the groundwater before applying a treatment to a particular contaminant, or it may be preferred to sparge a volatile component out of the water before addressing a chemical contaminant, or it may be preferred to adsorb a dissolved component out of the water before applying chemical treatment for another component. The in-series arrangement of the receptacles, or zones of receptacles 28, as shown in FIG. 5 permits this flexibility.

Figure 6:
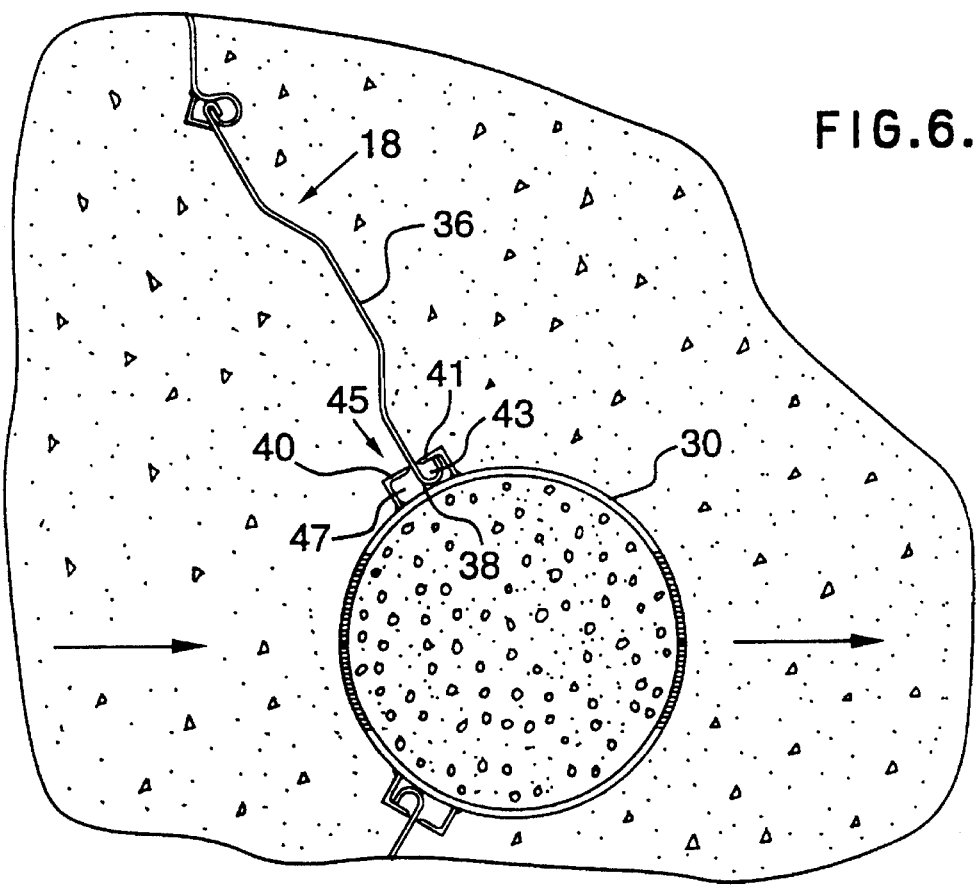
FIG. 6 is a plan view showing a detail of the construction of the waterproof wall.

FIG. 6 shows a detail of the manner by which the watertight wall 18 may be attached to a one-piece (welded) cylinder 30. The wall element 36 that is adjacent to the cylinder 30 is formed on its end with a rolled-over hook 38. Two parallel sections 40,41 of angle-form steel are welded to the cylinder 30. During driving, the hook 38 is engaged between the two sections, as shown.

The manner of the engagement of the hook 38 and the two angle-sections, 40,41 is such that a cavity 43 is created, as shown. The cavity 43 extends over all the vertical height of the engagement between the element 36 and the cylinder 30.

The dimension of the cavity 43 is such that a length of standard half-inch hose can be passed down the cavity. When water is fed through the hose, any dirt and debris residing in the cavity is flushed out. When the cavity 43 is flushed clear, a tube may be inserted into the cavity, through which is injected a suitable sealant material. The joint or junction 45 between the wall of the cylinder and the element of the watertight wall is, by this means, itself rendered watertight over its whole height.

The provision of such cavities 43 for rendering watertight a junction between pile-driven sheets is described in GB-2228760 (published 5 Sep. 90).

It may be noted that a similar cavity 47 is created alongside the cavity 43 and has almost the same dimensions. This other cavity may be the one which is flushed clean and injected with sealant if preferred. Indeed, flushing and injecting both cavities provides a junction that can be virtually guaranteed to be completely watertight.

As shown in FIG. 6, when the cylinder is a unitary whole component, simple angle sections can be welded onto the walls of the cylinder, thereby creating the cavities when the elements are inserted.

Figure 7:
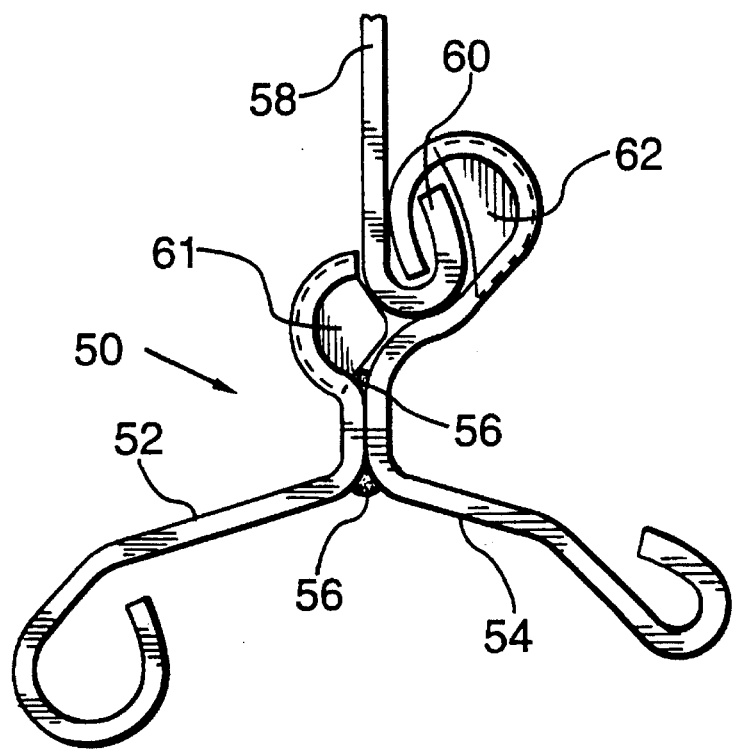
FIG. 7 is a plan view corresponding to FIG. 6, showing an alternative constructional detail.

When the receptacle itself is comprised of separately-driven pieces, watertight joints or junctions may be created in a similar manner as shown in FIG. 7.

In FIG. 7, the receptacle is not a right cylinder. The receptacle is made up of separately driven sections which form an encirclement. One of the section of the encirclement is the composite section 50 as shown in FIG. 7. (The other sections of the encirclement making up the receptacle are not shown in FIG. 7.) The section 50 comprises two elements 52,54, shaped as shown in FIG. 7 and welded together at 56.

An element 58 of the watertight wall is provided with a rolled-in hook 60. This hook engages with the rolled forms present on the wedges of the elements 52,54 to form the two whole-height, side-by-side cavities 61,62, as illustrated in FIG. 7. Such a junction may be made with only one cavity, but two are preferred, as described.

The junctions formed between the separately driven elements of the encirclement need not be watertight since it is intended that water will flow into and out of the encirclement. However, the joint or junction as shown in FIG. 7 between the encirclement and the element 58 of the watertight wall 18 is required to be watertight. In assessing which joints need not be watertight, it may be noted that the only water that should be allowed to pass through the gate is water that has been in contact with the treatement material for a-substantial residence time.

Figure 7A:
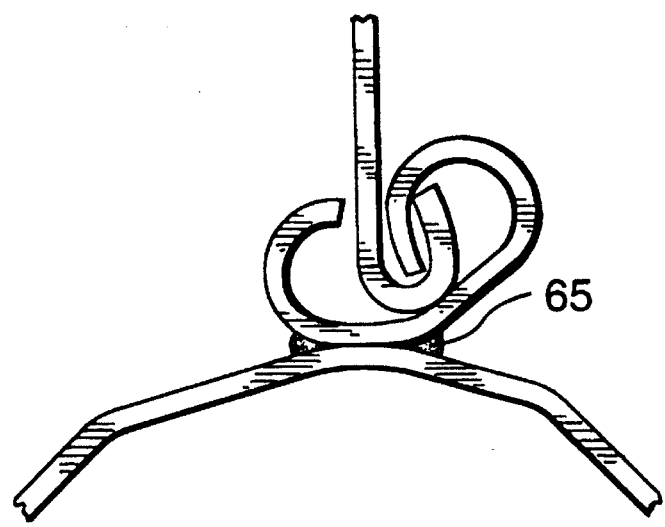

FIG. 7A is a diagram showing an alternative construction for the composite section. It will be noted that the weld 65 between the elements is located differently from the weld 56 in FIG. 7. It will be noted that if the weld 63 in FIG. 7A were incomplete, an unsealed leakage path through the watertight wall would exist, which is normally unacceptable. If the weld 56 in FIG. 7 were incomplete, on the other hand, no such leakage path is created. When elements and sections are welded together, therefore, the designer should seek to dispose the weld such that if the weld is incomplete, no leakage path through the wall would be created.

The designer should not require that the welded joint itself be watertight. It can be very expensive to weld the sections and elements together continuously to create a watertight welded joint: it is far cheaper just to tack the elements together at intervals, but tacking does not leave the welded joint completely sealed. For these reasons, the FIG. 7 arrangement is preferred to that of FIG. 7A.

Figure 8:
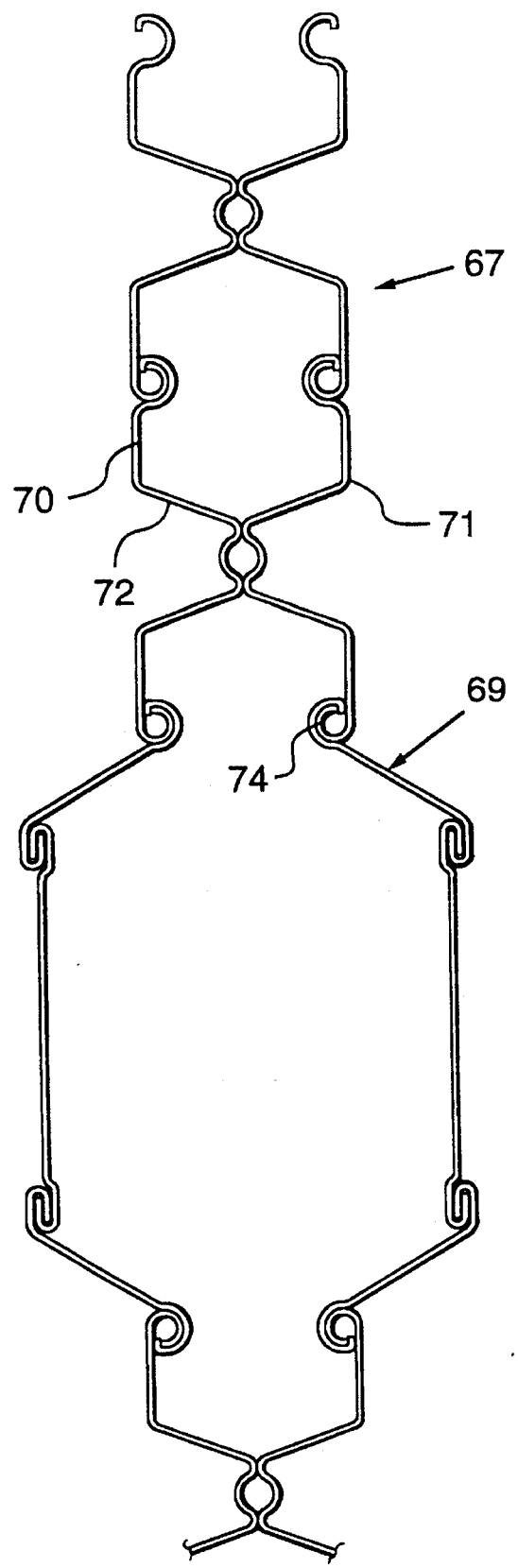
FIG. 8 is a plan view of a treatment system, in which the watertight wall is of cellular form.

A manner in which the watertightness of a pile-driven wall can be enhanced is to provide the wall in the form of a cellular wall. FIG. 8 shows a manner in which such a cellular wall 67 may be joined to a receptacle 69. The cellular wall construction provides two parallel walls 70,71 with dividers 72 straddling the spaces between the two walls at intervals. The cells thus created are intended each to be watertight with respect to the aquifer material outside the two walls, and with respect to each other. With a cellular wall, measurements can be taken of the height of the water table in each cell, to determine whether leakage into, or out of, that cell is occurring; if it is, it is a fairly simple matter to provide a constant draw-off of water from that cell to ensure that any contaminated water leaking into the cell cannot leak out.

The receptacle 69, which is to receive treatment material for cleaning up the contaminants, can be constituted simply as an "enlarged cell" of the cellular wall, as shown in FIG. 8.

The type of contaminant, the type of aquifer, the natural velocity of the water through the ground, the temperature of the water, the pH level, and so on, are all factors that need to be assessed when designing the treatment curtain in the form of the gated barrier. The designer should see to it that the contaminant remains in contact with the treatment material for a sufficient residence time that breakdown of the contaminant can be completed, and yet he wishes also to ensure that the curtain does not provide such a barrier that the plume might be diverted around the barrier.

The gated barrier system, as described, provides a means for feeding contaminated water through a body of treatment material. When the system as described is not used, ie when the water passes instead through an excavated trench containing the treatment material, the usual problem arises that the treatment material is not homogenous, so that residence times are rather indeterminate. Apart from that, excavating a trench and filling it with treatment material can be expensive, both as regards the operation, and as regards the expense of providing the quantity of treatment material required.

In the trench system, it is desirable for safety margin purposes, to provide an excess of treatment material, but this only adds to the cost problem. If it were desired, for example, to increase residence time by, say, 50 percent, it would be necessary to add 50 percent extra material over the whole extent and height of the trench, in addition to the other marginal provision already in place.

In the gated barrier system, the treatment material is placed in the ground under much more controlled condition so that large safety and contingency margins are not needed. The quantity of material is determined virtually completely simply by the residence time assessed for the particular contaminant.

In the gated barrier system, not only is the treatment material inserted under more controlled conditions, but the passage of the water through the treatment material is more controlled. For instance, compared with the trench system, it is much less likely that a "path of low resistance" through the material could accidentally develop in the gated barrier system.

As mentioned, gated curtains as described can be utilised in the treatment of contaminants that are present in, and are hazardous in, trace quantities, as well as contaminants that are present in, and are hazardous in, bulk quantities.

One difference between treating bulk contaminants and trace contaminants is that with bulk contaminants the treatment material tends to become used up and to disappear. When treating trace contaminants, by contrast, the treatment material can be expected to last much longer. However, even some trace contaminants, when being broken down, sometimes cause reactions that tend to use up large quantities of treatment material, whereby the treatment material can become depleted. Also, some of the materials used as treatment materials can themselves breakdown if kept in the ground, under water, for a prolonged period.

Figure 9:
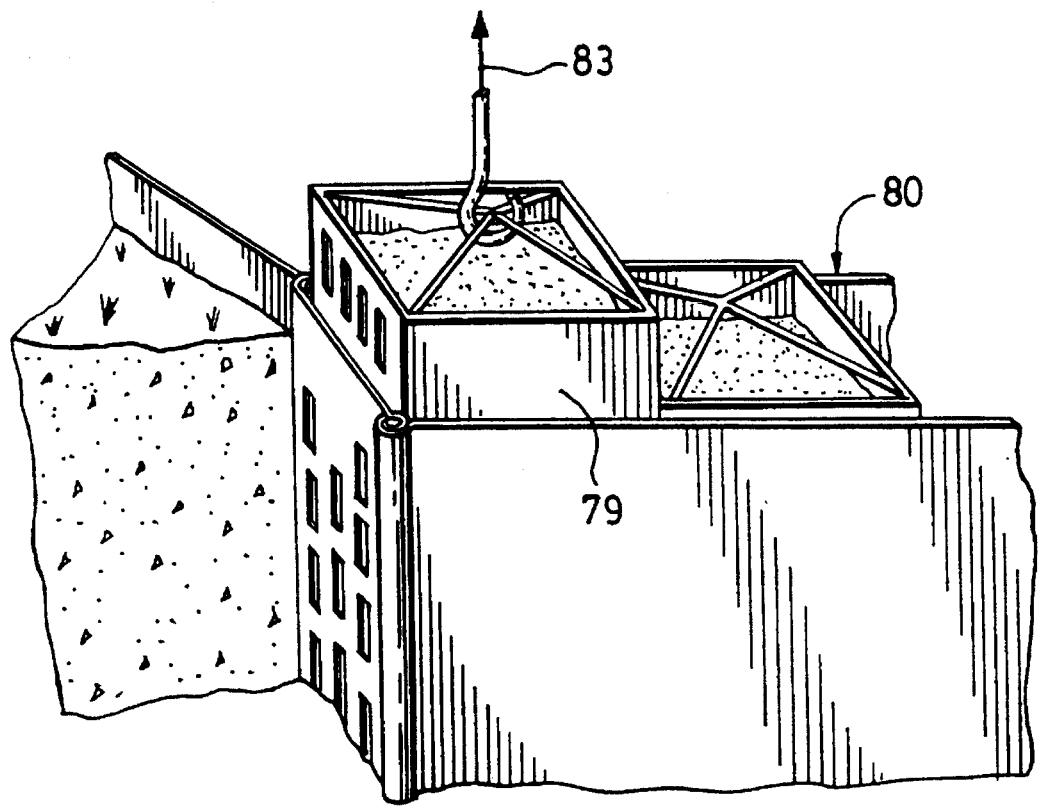
FIG. 9 illustrates the use of a take-out basket in the receptacle.

FIG. 9 shows baskets 79 inserted into the receptacle 80. When the treatment material contained in the basket is used up, the basket is removed from the receptacle, using a crane 83, and its place taken by a basket of fresh treatment material. If desired, baskets can be stacked one above another, and in series, as shown in FIG. 9.

As described, the receptacles are fitted with slots or the like through which groundwater can pass. The size of these openings should be such that water can pass through unhindered, but the sand/gavel material of the aquifer should not be able to enter the receptacle; similarly, the treatment material should not be able to leave the receptacle.

Figure 10:
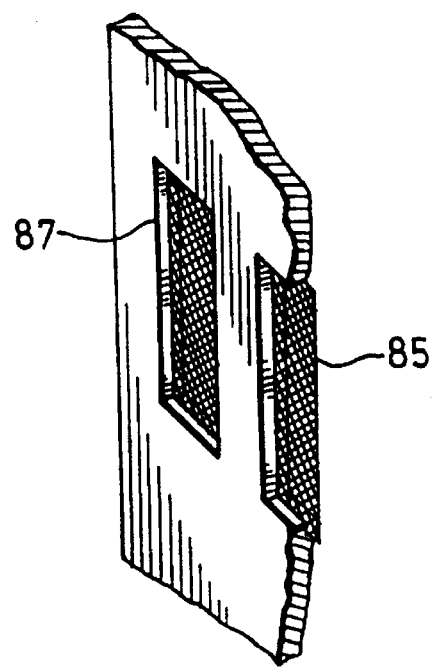
FIG. 10 illustrates the use of screens to prevent movement of solid material into and out of the receptacle.

It is not usually practicable to trap grains smaller than about 1 mm diameter by means of slots cut in the metal of the pile sheeting. If smaller grains are present (ie silt), screens Should be provided as shown in FIG. 10. These screens 85 may be, for example, of perforated thin steel sheet, or may be of geotextile (fabric) material.

Such screens are incapable of contributing to the strength of the pile-driven wall elements, and indeed must be protected from the rigours of pile-driving. However, it is often simple enough to provide a cut-out 87 in the wall element, the cut-outs being small enough not to impair the strength the element, and to affix the screen in the cut-out.

In the previously described trench system, the active treatment material had to occupy the whole extent and depth of the trench. The width of the trench was determined by the manner of making the trench, but a width of 1 meter or so is typical. In fact, because of the restrictions in the manner of making the trench, the width of the trench cannot, in practice, deviate very much from this 1 meter figure. Therefore, whatever the residence time, as determined by the requirements of the chemical reactions, and whatever the natural velocity of the groundwater through the trench, the designer was constrained by the fact that the trench has to be about 1 meter wide. Also, the designer was constrained by the fact that he must allow a margin for the inevitable non-homogeneities in the material inserted into the trench, especially when the active material is mixed with an inert filler, such as sand, or a retardant, such as activated carbon.

The trench system, therefore, though excellent within its applications, places constraints on the designer, and can involve the provision of redundant material and the carrying out of redundant, but unavoidable, excavations. With the gated barrier system, the designer is much less constrained by dimensions. The dimensions of the receptacle can be adjusted to suit the particular parameters over a much wider range.

Some trace contaminants, even though present in only tiny quantities, nevertheless require a long residence time to ensure complete breakdown of the contaminant. The values of the parameters such as the quantitative mix of inert filler, retardant, and active material, and the required "active" length of the receptacle (ie the length in the direction of the velocity of the water) can be quite different from the values of those same parameters when the contaminant is, for example, a quick-to-break-down bulk contaminant. The gated curtain system provides the designer with the flexibility to design a system to cope with a variety of different requirements.

In the gate barrier system, the increased control over the ingredients which go into the receptacle is particularly valuable to the designer, as is the ability to set the active length of the receptacle to an optimum value. In fact, the designer can set the active length of the receptacle to be dimensionally quite long, if necessary, in order to provide a long residence time; in the region, for example, of several meters. (The designer should ensure that the sides of such a long receptacle are watertight.)

In the trench system, if only a small quantity of active material was required theoretically, nevertheless large quantities of the material had to be provided. If the active material were dispersed too thinly in the filler material, the contaminant might not achieve the required length of time of contact needed to ensure breakdown. In the gated barrier system, generally it is possible to make the mix of the active material more concentrated, which leads to economies as regards the quantity of active material to be provided, and as regards the quantity of material to be excavated from the aquifer.

Substances which act as retardants, such as activated carbon, can be expensive in large quantities. In the gated barrier system the designer can compare the expense of either providing (more) retardant or of extending the active length of the receptacle: both options are available in the system.

In the gated barrier system, the flow of groundwater is channelled, and therefore has an increased velocity as it passes through the gates; however, this need not lead to the disadvantage that long residence times cannot be provided. This seeming disadvantage is avoided because of the ability to insert and retain the retardants with a good degree of reliability and control, and because the active length of the receptacle can be several meters long. The design constraint due to the increase in water velocity is more than compensated by the extra versatility in the design of the receptacle and its contents.

Because all water that passes through the curtain emerges directly from the receptacles, it is practical to monitor the emerging water with sufficient accuracy to determine the performance of the water treatment system. When a gate is found to be performing unsatisfactorily, a well can be positioned downstream of the gate to intercept the emerging water until such time as the gate is repaired. If it is inconvenient to repair a badly performing gate, a further curtain may be installed downstream, either of the whole curtain or of just that one gate.

Wells can be positioned downstream of the curtain in any event, in order to draw the groundwater through the curtain, if that should be desired.

It should be noted that the gated barrier system, as described, is suitable for a complete enclosure. For example, the need can arise for a piece of property to be completely encircled with a watertight barrier, so that there can be no flow of possibly contaminated water off the property. The gated barrier system can be used in that case: the system depends on a through-flow of the groundwater, and on the fact that the pressure head of the groundwater upstream of the curtain is higher than that downstream, but this condition can arise due to rain and snow-melt on the property. It does not matter if the flow of water through the gates sometimes reverses: the purpose of the system is only to prevent contaminants leaving the property.

The invention is concerned with providing economical treatment of the contaminated groundwater, while guaranteeing, as far as possible, that the targeted contaminants are present only at permitted levels in the water emerging from the treatment system.

One factor that enhances the efficiency of treatment systems in the invention is the provision of a withdrawable caisson; here, a caisson is driven or vibrated down into the ground, then the soil material is excavated from inside the caisson, and then the caisson is removed. This provision, and some variations to it, will now be described.

Figure 11:
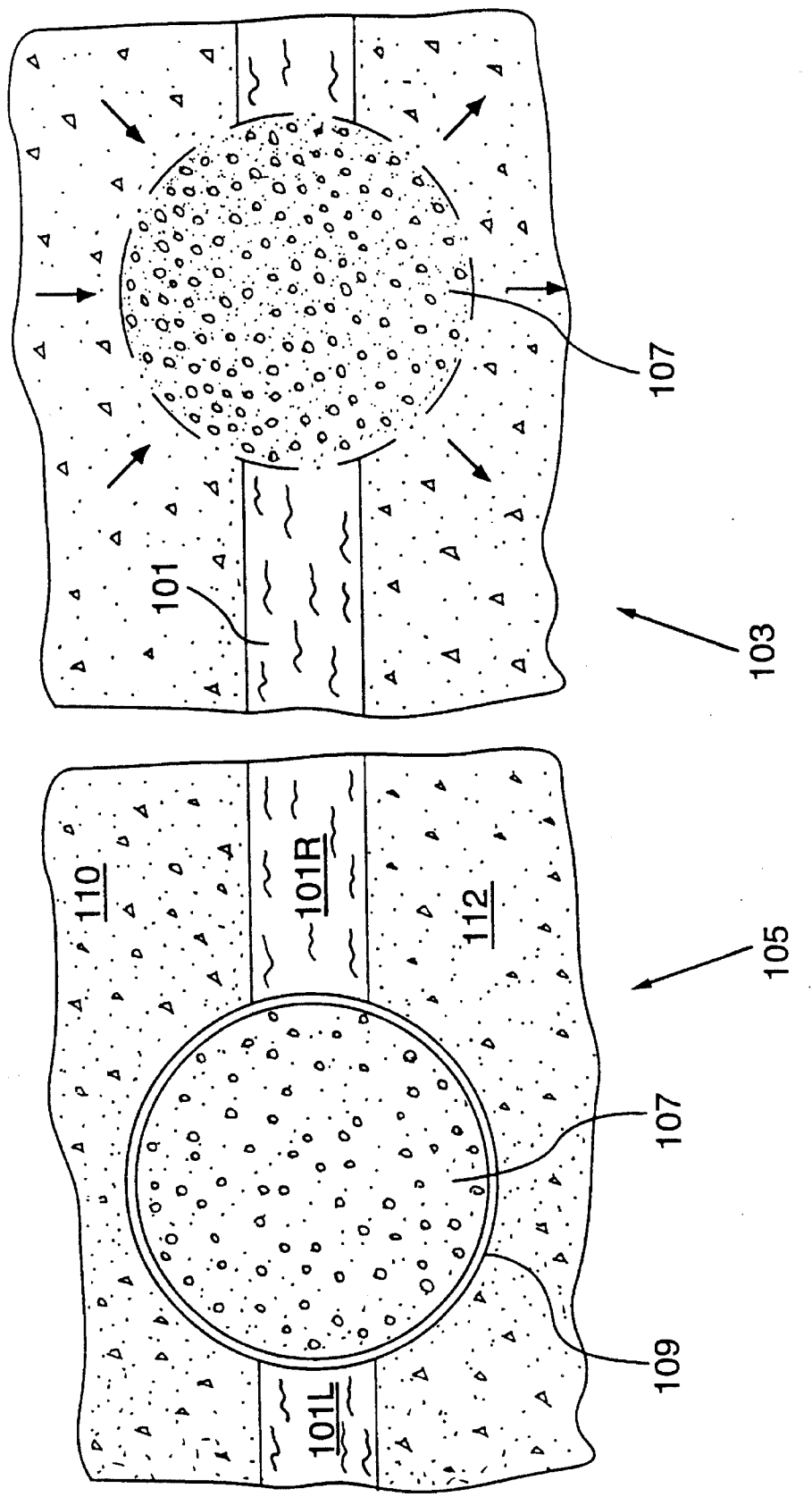
FIG. 11 is a plan view of a treatment system, showing the installation of treatment gates in a slurry wall, and illustrating the use of a removable caisson.

FIG. 11 shows a slurry wall 101. Such a slurry wall is formed by excavating a trench down into the ground using a powered back-hoe. As the trench is being excavated, the trench is kept topped up by adding bentonite slurry, being a mixture of, typically, 3 to 10 percent bentonite with sand or silt. The bentonite slurry enters the trench, and serves to keep the sides of the trench from caving in. The slurry achieves the consistency of butter after installation in the trench. Properly installed, a slurry wall is virtually completely watertight. Slurry walls can be inserted quite deeply: below the limit of the back-hoe, soil material can still be removed from the bottom of the trench by means of a clam-shell extractor. The slurry wall extends deep enough to contain the contaminated groundwater, and may extend right down to, for example, a clay or other impermeable layer below the aquifer.

As shown in FIG. 11, a gate 103 is installed in the slurry wall 101. Adjacent gate 105 is the same, but is shown during a stage of construction.

It is generally advisable to install the whole slurry wall 101, and then to install the gates in the wall, rather than to try to build the gate into the wall at the same time as the slurry wall is being formed. Alternatively, the gate may be installed in an already existing slurry wall.

The gate 103 comprises a permeable body of treatment material 107. As shown, gate 105 is provided (temporarily) with a caisson 109. This caisson is a robust, metal, hollow, open-ended, withdrawable caisson, which is driven down into the ground at the site of the gate. The caisson straddles the slurry wall 101, and divides the wall into left and right portions 101L and 101R. The caisson 109 is in contact with the aquifer material on the upstream side 110, and on the downstream side 112, of the wall 101.

Once the caisson has been driven down fully into the aquifer and into the slurry wall, the soil inside the caisson is removed.

This can be done by the use of an auger of a diameter which fits snugly (but of course not tightly) inside the caisson. Any soil material still remaining after augering can be removed by flushing, suction, or other methods.

The caisson must be strong enough that it does not collapse from outside pressure when it has been emptied inside.

When the interior of the caisson 109 is substantially clear and clean, the treatment material 107 is placed inside the caisson.

Next, the caisson 109 is lifted out of the ground. This is done by applying vibrations to the caisson while applying an upward lift (from a crane or hoist). With the caisson out of the way, as in gate 103, the treatment material is in communication with the aquifer upstream and downstream, and is sealed to the slurry wall to the left and right.

One of the possible problems that might arise with the system of FIG. 11 is that the minimum distance the water has to travel between the upstream aquifer 110 and the downstream aquifer 112 is no more than the thickness of the slurry wall 101, and this distance may not be far enough to ensure a sufficient residence time of the contaminated water in contact with the treatment material 107.

It will sometimes be preferred to increase the distance, and hence the time, over which the water remains in contact with the treatment material. This can be done by providing a gate-sealing-means which amounts to more than just the sealing contact obtaining between the treatment material and the material of the slurry wall.

Figure 12A:
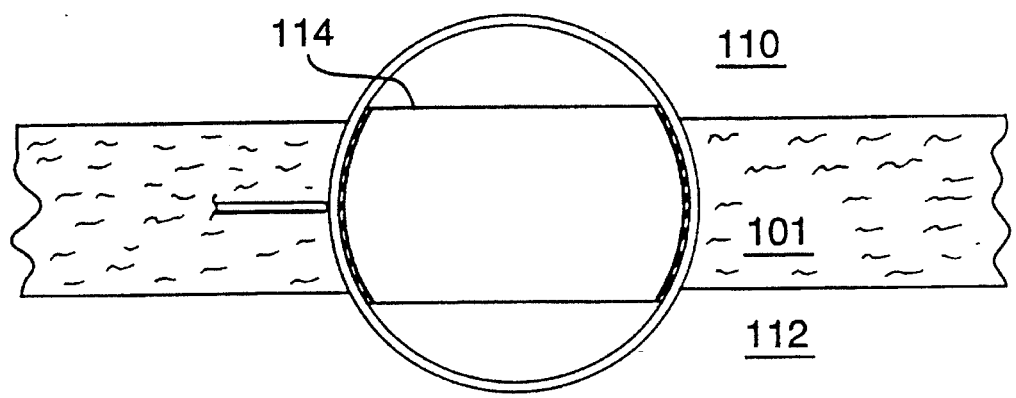
FIG. 12A is a plan view of a similar treatment system to that of FIG. 11.
Figure 12B:
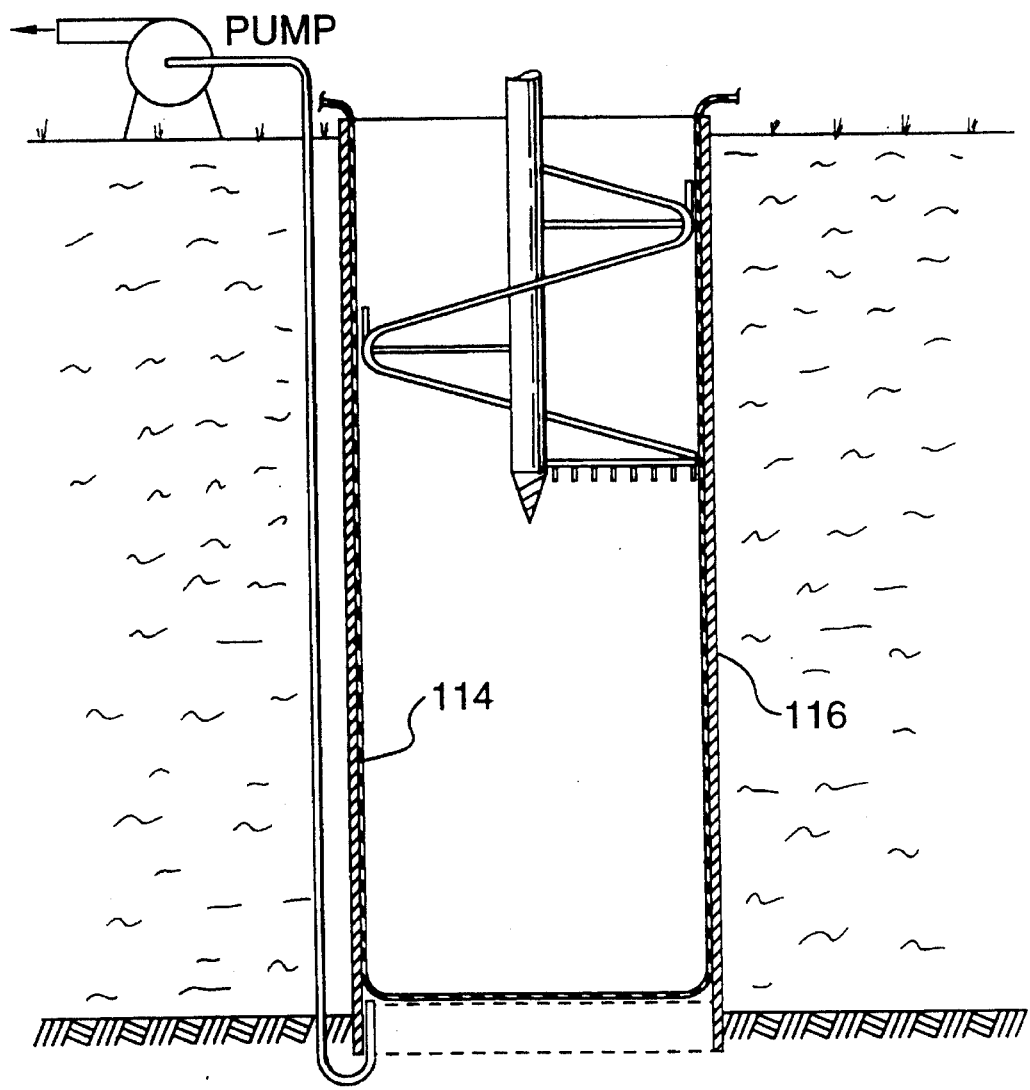
FIG. 12B is a vertical cross-section of the system of FIG. 12A.

FIGS. 12A and 12B show an extended gate-sealing means. In this case, the gate sealing means comprises a flexible liner 114. The liner is placed in the caisson 116 after the caisson has been cleaned out, but before the treatment material has been inserted. With the liner and treatment material in place, the caisson is withdrawn from the ground.

The liner 114 is left protruding into the upstream and downstream aquifers 110,112. The liner serves to increase the residence distance, and hence residence time, of the water in passing through the treatment material. Also, the liner serves to keep the material of the slurry wall 101 from infiltrating into the body of treatment material.

The liner 114 is of flexible plastic. Alternatively, the liner may be of the kind in which bentonite is sandwiched between two layers of geotextile fabric. Alternatively again, the liner 114 may in fact be of metal. (The liner would then not be flexible, but the metal may be curved as shown.) In each case, the liner remains in the ground when the caisson is withdrawn.

A point to be noted by users of designs such as FIG. 11 or FIG. 12 is that the caisson should be withdrawn carefully, so that the material of the slurry wall is disturbed as little as possible, and settles back, after the caisson passes, into sealing contact with the material inside the caisson.

Figure 13:
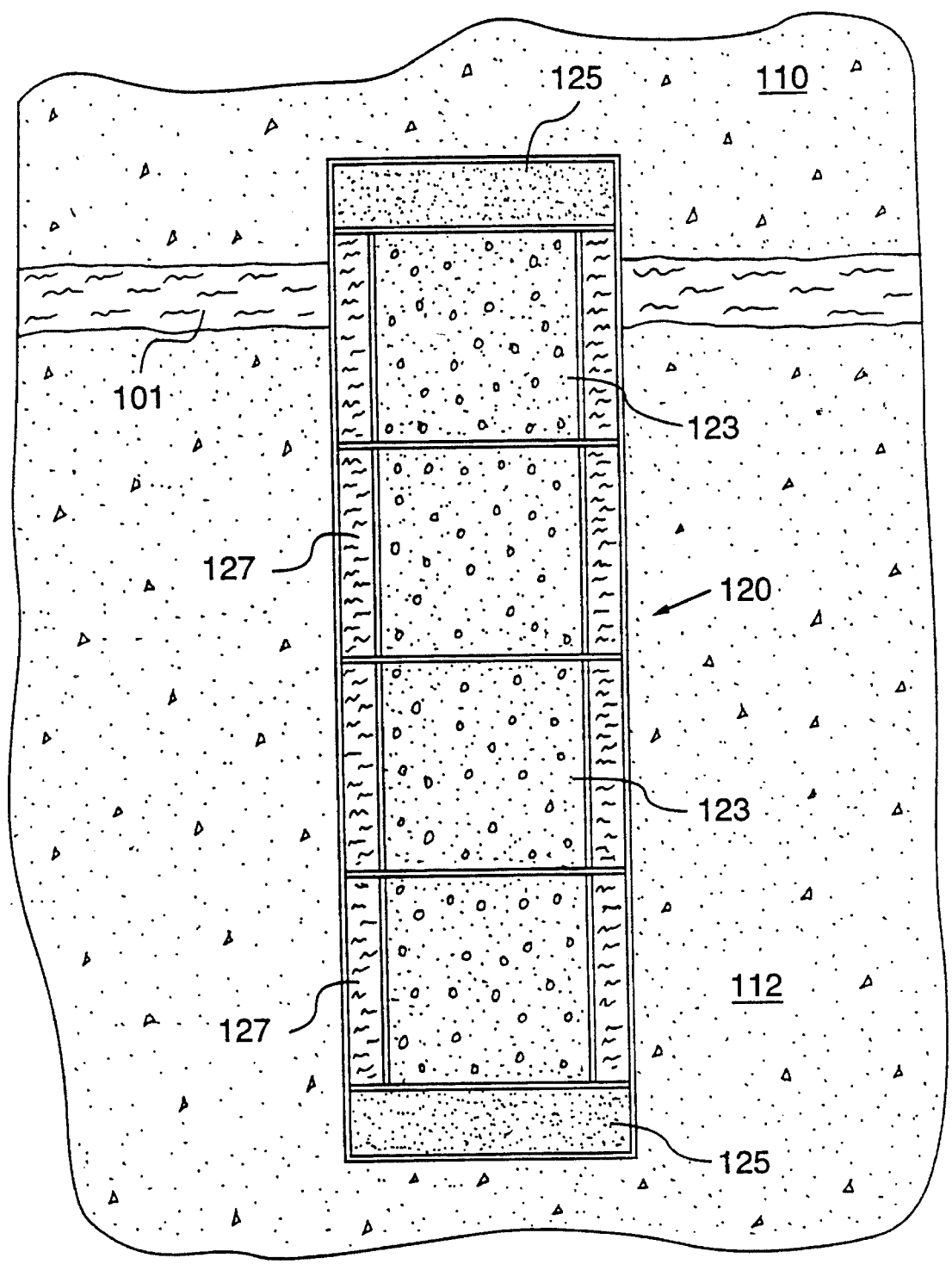
FIG. 13 is a plan view of a treatment system which utilises a rectangular removable caisson.

It is not necessary that the caisson be cylindrical, and in fact the cylindrical shape is not good when the gate is required to be long. FIG. 13 shows a rectangular caisson 120, of a more complex shape. In FIG. 13, the metal caisson may be in interlocking sections which can be driven in separately. The caisson is formed with a number of compartments, which are cleared out after the caisson has been hammered or driven into the ground. The treatment material is put into the inner compartment 123. Upstream and downstream compartments 125 house a peat-gravel or sand-silt fill of suitable porosity. Side compartments 127 contain bentonite slurry. When the caisson 120 is withdrawn, these materials remain in place.

As has been described, the use of the removable caisson is highly advantageous when building the gates. It will now be explained that the removable caisson is even more beneficial when used in conjunction with a receptacle which remains in the ground after the caisson is withdrawn. A benefit of the combination of removable caisson and in-ground receptacle is that the receptacle can be lowered into the empty space inside the cleaned-out interior of the caisson. Backfilling with treatment material, porous material, sealing material, etc, can then take place under accessible, controlled, conditions.

Also, because the receptacle is lowered into the interior of the caisson after the caisson has been cleared out, the receptacle can be fitted with relatively fragile components such as screens. Screens are apt to be damaged if present on a component that is driven directly into the ground.

Figure 14:
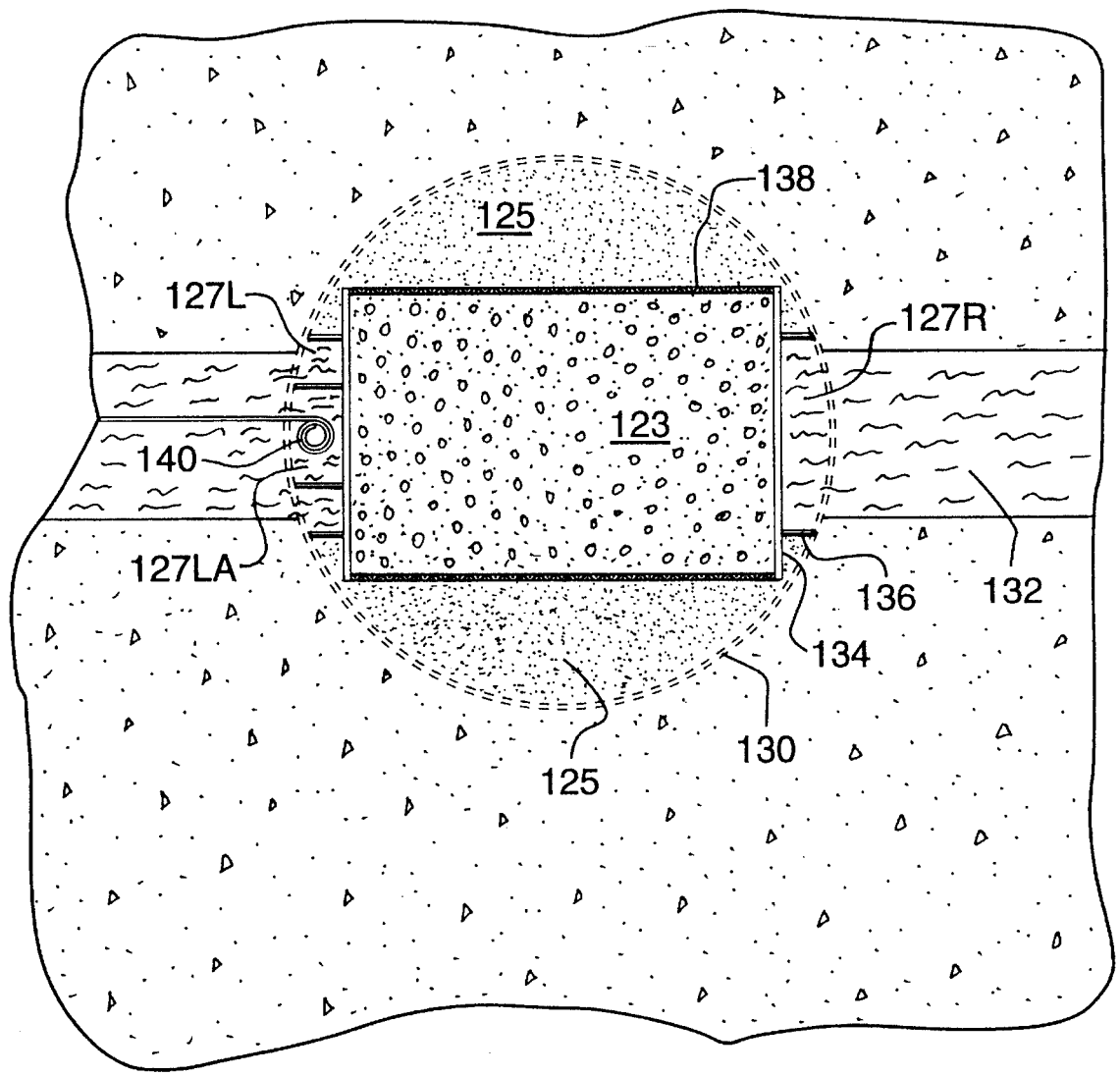
FIG. 14 is a plan view of a treatment system which uses a removable caisson and which illutrates the use of a receptacle.

In FIG. 14, the cylindrical removable caisson 130 is driven into the aquifer and into the slurry wall 132. When the caisson has been cleaned out, a receptacle 134 is lowered into the caisson. The receptacle is provided with wings 136. The arrangement is that the outer edges of these wings brush against the inside of the caisson. The wings, being cantilevered from the receptacle, are somewhat resilient, and the receptacle slides easily down inside the caisson even if there should be some distortion of the caisson.

The wings and the receptacle divide the space inside the caisson into a number of compartments 123,125, with the same functions as was described in relation to FIG. 13.

The receptacle 134 is fitted with screens 138, which keep the treatment material from being infiltrated by, and becoming mixed with, the other materials. The screens comprise one or more layers of fine mesh; the mesh is of the type that would hardly survive the receptacle being driven into the ground, but, as described, the receptacle is not driven into the ground but rather is lowered into an empty space.

The right side compartment 127R in FIG. 14 contains bentonite slurry, and when the caisson 130 is taken out the slurry in the compartment settles into sealing contact with the slurry of the wall 132.

The left side compartment 127L of FIG. 14 illustrates a variation, wherein the slurry wall contains plastic sheeting. The purpose of the sheeting is to lend an extra level of water-tightness, or at least of proof of water-tightness. Such plastic sheeting is installed by placing a roll of the sheeting in the (soft) slurry, and drawing the sheet along the trench, off the roll. In FIG. 14, the roll 140 of the sheeting is placed in the side compartment 127L. The side compartment in fact includes a separate pocket 127LA which houses the roll, which allows the roll to be placed in a bentonite slurry mixture of a different consistency, should that be required, from that of the material placed in the outer portion of the compartment 127L.

FIGS. 11 to 14 have illustrated the use of withdrawable caissons with slurry walls. Other types of waterproof wall are available, and the invention can be used in respect of those types of wall also, as will now be described.

Figure 15:
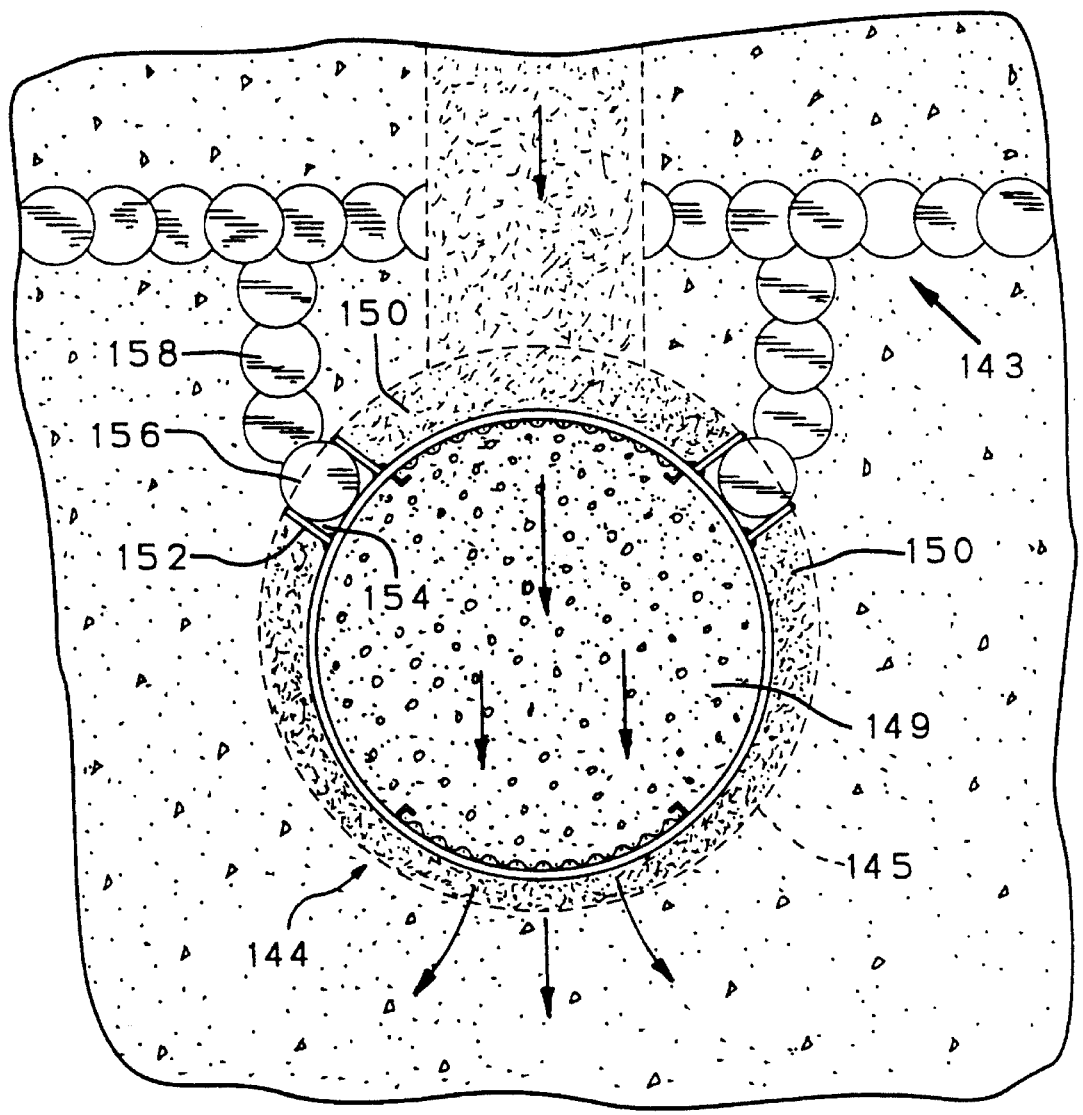
FIG. 15 is a plan view of a treatment system in which a treatment gate is inserted into a concrete wall.

FIG. 15 shows a wall 143 of the type known as a jet gout wall. In making a jet-gout wall, a hole of small diameter is drilled down to the required depth, and a jetting unit is inserted into the hole. When at depth, a jet of gout or cement is blown from the end of the jetting unit as the jetting unit is slowly drawn out of the hole. The soil material around the jetting unit is consolidated with the cement blown out of the jetting unit, whereby a column of cement of much larger diameter than the initial hole is produced. The engineer provides that the holes are drilled at the appropriate spacing to give a continuous unbroken wall.

In FIG. 15, a gate 144 is installed in the already existing wall 143. Preferably, in the case of the jet-gout wall, the gate should be installed at the same time as the wall is being built, because of the difficulties of breaking an opening in an already existing in-gound concrete wall.

A removable caisson is shown in dashed lines 145. A receptacle 147 is lowered into the cleaned-out interior of the caisson. The compartment 149 is filled with treatment material and the compartments 150 are filled with porous peat/gavel as previously described. Wings 152 are provided on the receptacle 147, and these define, with the caisson 145, left and right side compartments 154.

After the caisson 145 has been removed (the receptacle 147 remains in the ground), the jetting unit is lowered into the side compartment 154. The concrete column 156 produced by the jetting process can be expected to fill, and to seal itself into, the compartment 154. Thus, in FIG. 15 the side compartment 154 is sealed by the injection of cement into the compartment. Further jet-gout columns 158 can be inserted to join the column 156 up to the wall 143.

Figure 16:
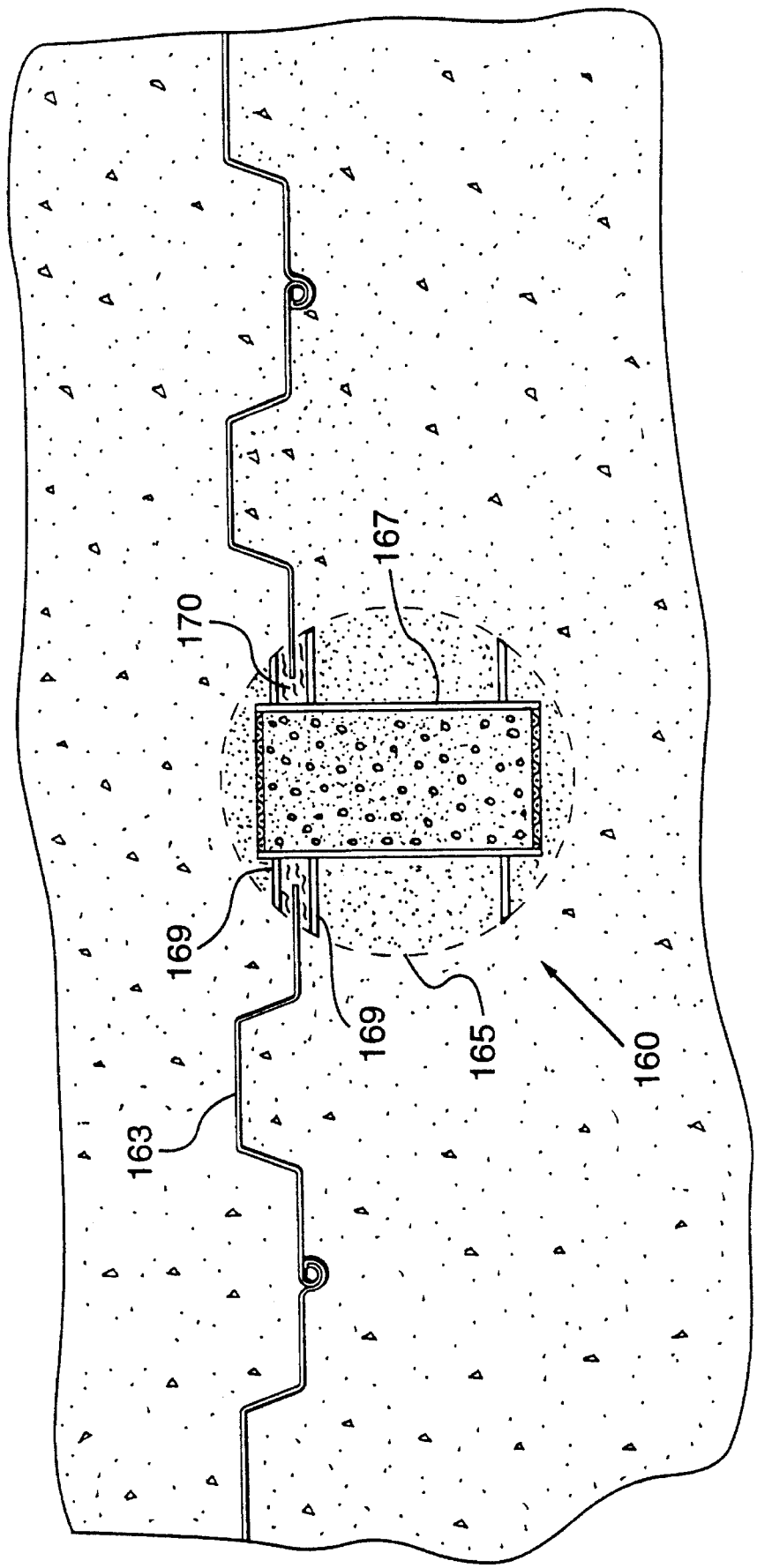
FIG. 16 is a plan view of a treatment system in which a slurry seal is effected between a watertight wall and a receptacle.

FIG. 16 shows a gate 160 which is installed into a watertight wall comprised of interlocking sheet-metal pile-driven elements 163. A removable cylindrical caisson 165 is first driven into the ground at the gate site, and cleaned out, as described. A receptacle 167 is lowered into the interior of the caisson. Wings 168 on the receptacle define, with the caisson, the compartments, in the manner as previously described. The side compartments 169 are filled with bentonite or bentonite slurry.

The caisson 165 is removed, and the elements 163 of the wall are then driven into place. The seal between the wall and the receptacle then in this case simply comprises the engagement of the ends of the elements with the bentonite in the side compartments 169.

The FIG. 16 design may be contrasted with the design shown in, for example, FIG. 6, which also shows receptacles sealed to pile-driven sheet-steel elements. In FIG. 16, metal-to-metal contact is not required for the seal, with the result that the FIG. 16 design is highly tolerant of mismatch between the elements 163 and the receptacle 167. The sealed joint shown in FIG. 16 between the wall and the receptacle, though providing a very reliable seal and being tolerant of mismatch, is nonetheless economical.

Figure 17:
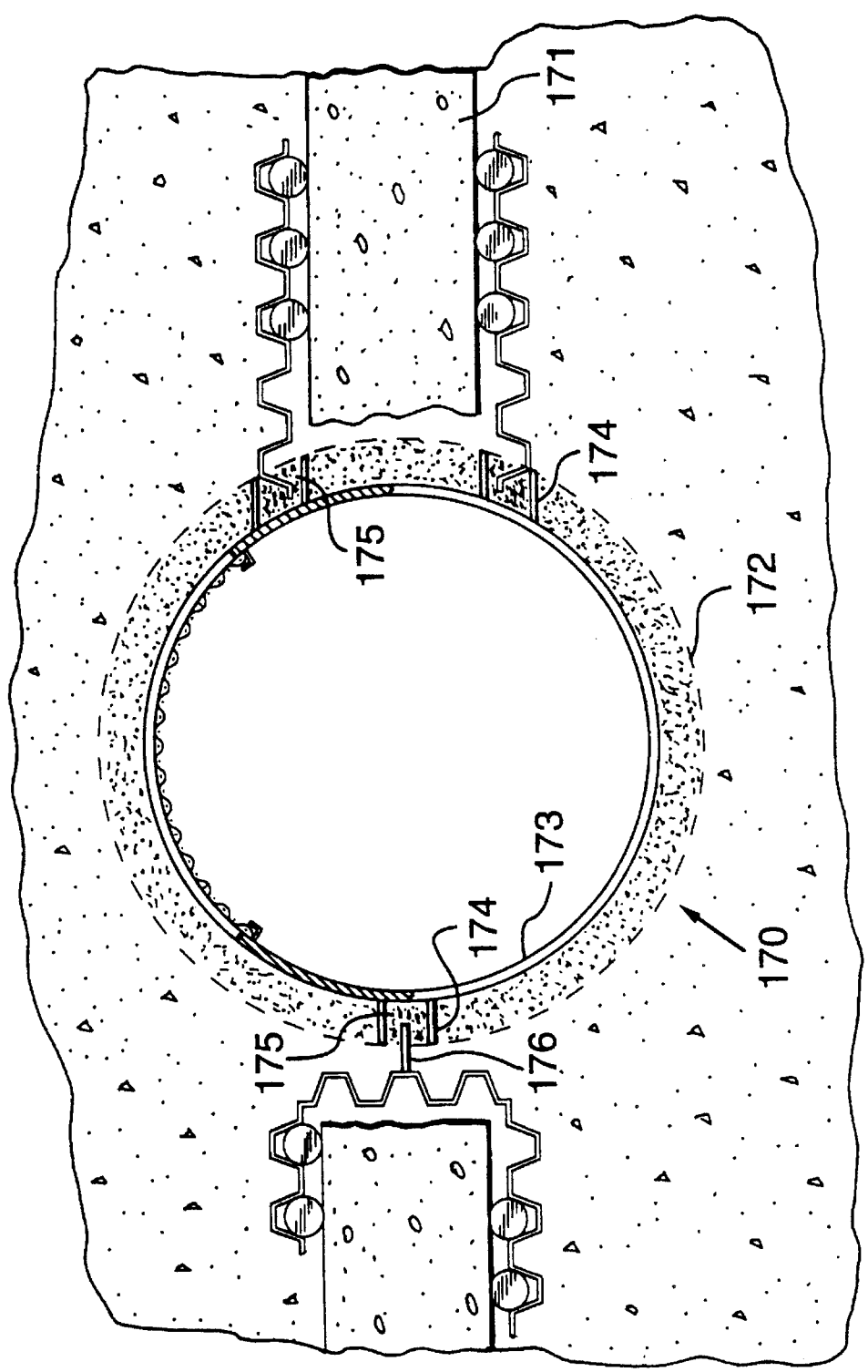
FIG. 17 is a plan view of a treatment system, showing the use of a slurry seal to seal a receptacle to a slab-concrete wall.

FIG. 17 shows another type of gate. The gate 170 is inserted into a concrete slab wall 171. Preferably, the gate is inserted at the same time as the wall is being inserted; this avoids the difficulty of breaking an opening in the wall. Again, a removable caisson 172 is inserted at the gate site, and is cleaned out by augering, etc as described. Next, a receptacle 173 is lowered into the empty caisson. Wings 174 on the receptacle engage the inside of the caisson to create compartments, as previously described. The side compartments 175 are filled with bentonite or other sealant material.

After the caisson 172 is removed, sheet metal elements 176 are pile-driven into the compartments 175. As shown, the elements are so shaped as to cap the ends of the concrete wall. The elements are sealed to the concrete wall using the jet-grouting techniques as previously described.

It will be understood that, by the means described, the receptacle 173 is sealed to the concrete wall with a very high reliability. The mismatch tolerance that arises from simply placing the end of the element in a compartment of bentonite is very useful in the case where the wall is massively unyielding, and so is the receptacle.

As mentioned, sometimes it is an advantage to increase the residence time which the contaminated groundwater spends in contact with the treatment material. However, it is convenient to use the conventional cylindrical form for the removable caisson, and a problem can arise that the cylindrical caisson has to become very large in diameter in order to provide a long length of passage of the water through the gate, and hence a long residence time. Sometimes, as mentioned, it becomes more economical to use a rectangular caisson. The rectangular caisson can be made as long as desired. The rectangular caisson can be made in sections, whereby the length of the caisson can be adjusted in multiples of standard sections.

It is of course essential that the treatment material in the gate be in communication with the aquifer upstream and downstream of the gate. Again, it is preferred also that the caisson, being the component which is violently hammered into the ground, does not include apertures or screens, etc, which could lead to distortion and damage. It is the compromise between these two aspects which render the use of the withdrawable caisson, as described, so advantageous. However, it is not a requirement that the whole of the caisson be withdrawn; it is only required that the portions of the casing that lie between the treatment material and the upstream and downstream aquifers be withdrawn. The sides of the caisson can, if desired, be left in the ground.

Similarly, in the case where the caisson is made in separate sections, which are driven in separately, it can be advantageous if only some of the sections of the caisson later have to be removed. And it is when the caisson is rectangular that it is most appropriate to make the caisson in separate sections.

It is recognised that, when the caisson is in separate sections, some of which are left in the ground, the caisson remnants that remain in the ground can serve to couple the gate to the wall, and can serve as components for making the seal between the gate and the wall. The design of gate shown in FIG. 18 utilises remnants of the caisson in this manner.

Figure 18:
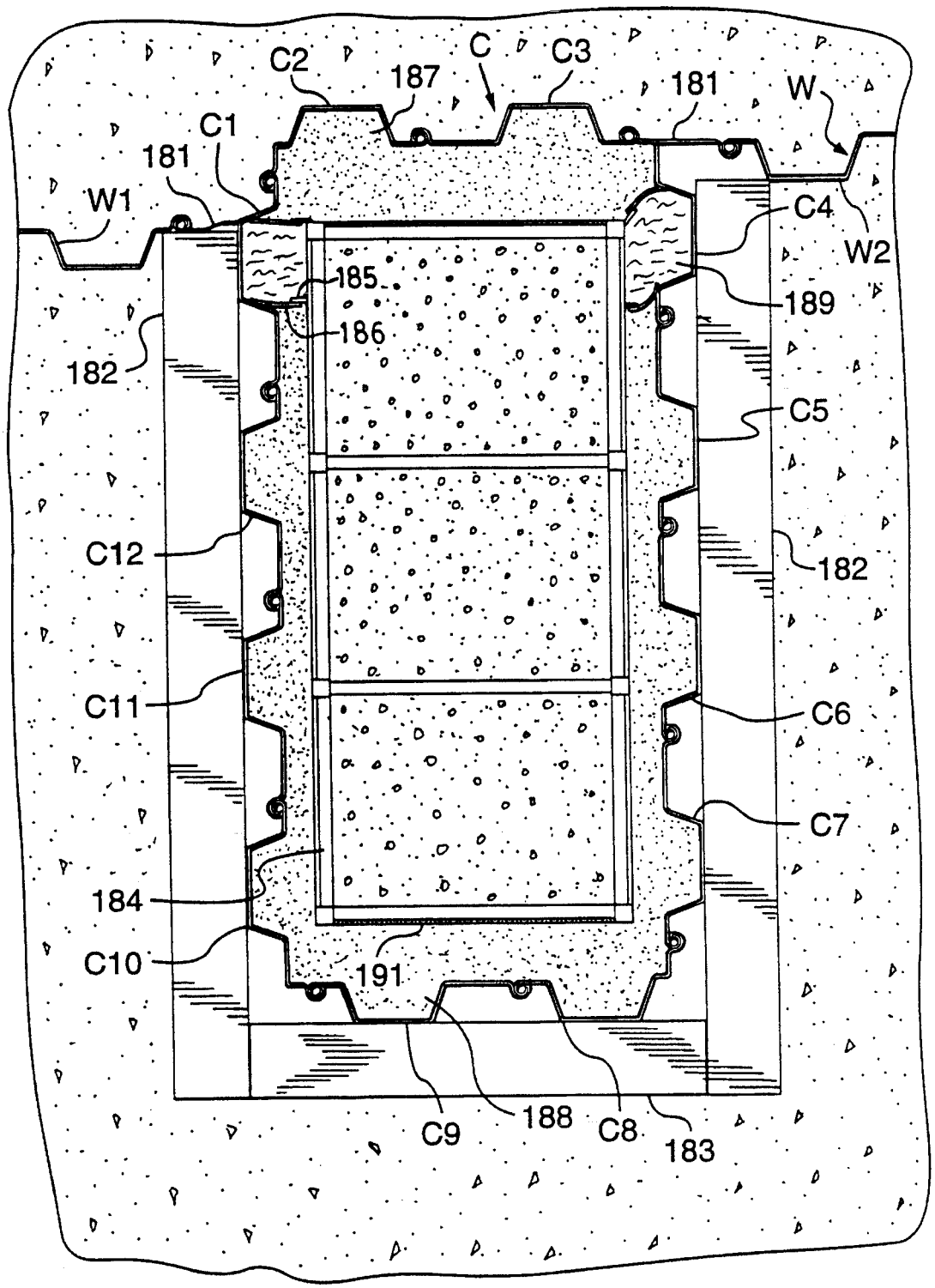
FIG. 18 is a plan view of a treatment system, which utilises a partially-withdrawable caisson.

The caisson C of FIG. 18 comprises sheet-metal pile-driven elements C1,C2,C3 . . . C12, as shown. These elements are interlocked at their edges, and form a complete enclosure. After installation of the elements, the interior of the caisson is cleaned out, in the manner as previously described.

Elements C1 and C4 are provided with welded-on extensions 181, by means of which elements W1,W2 of a watertight wall W which are also driven into the ground, are connected to the caisson.

There is a tendency for the sides of the caisson C to collapse inwards when the interior of the caisson is cleaned out—that is one of the problem of a long, rectangular gate. This tendency can be resisted somewhat by welding heavy girders 182 to the tops of the elements. Of course, these girders can only reinforce the tops of the elements, but often that is sufficient. A cross-brace girder 183 is provided at the end of the caisson furthest from the wall W: a corresponding cross-brace girder near the wall would be superfluous since that end of the caisson is already braced by the wall W. If the caisson is to be braced in this way, the welding of the girders to the caisson elements should be carried out before the soil material is excavated and removed from inside the caisson.

When the caisson has been cleaned out, and the girders 182,183, if required, have been welded in place, a receptacle 184 is lowered down into the interior of the caisson C. The receptacle 184 includes wings 185. The wings have rubber flap extensions 186 in place of the all-metal wings of the other designs described; all-metal wings might not have enough resilience because of the increased likelihood of distortion of the rectangular caisson C.

Together, the receptacle and the caisson define upstream 187 and downstream 188 compartments which are filled with sand/gravel or the like, side-seal compartments 189 which are filled with bentonite sealant or the like, and a treatment material compartment containing the receptacle 184. The interior of the receptacle can be arranged to receive the treatment material in removable baskets, in the manner as shown in FIG. 9, if desired. The receptacle includes screens 191 to prevent infiltration of other materials into the treatment material, and to keep the treatment material contained.

After all the compartments have been made up, the front and rear caisson elements C2,C3,C8,C9 are withdrawn. The rest of the elements C1,C4,C5,C6,C7,C10,C11,C12 of the caisson are left in the ground.

Figure 19:
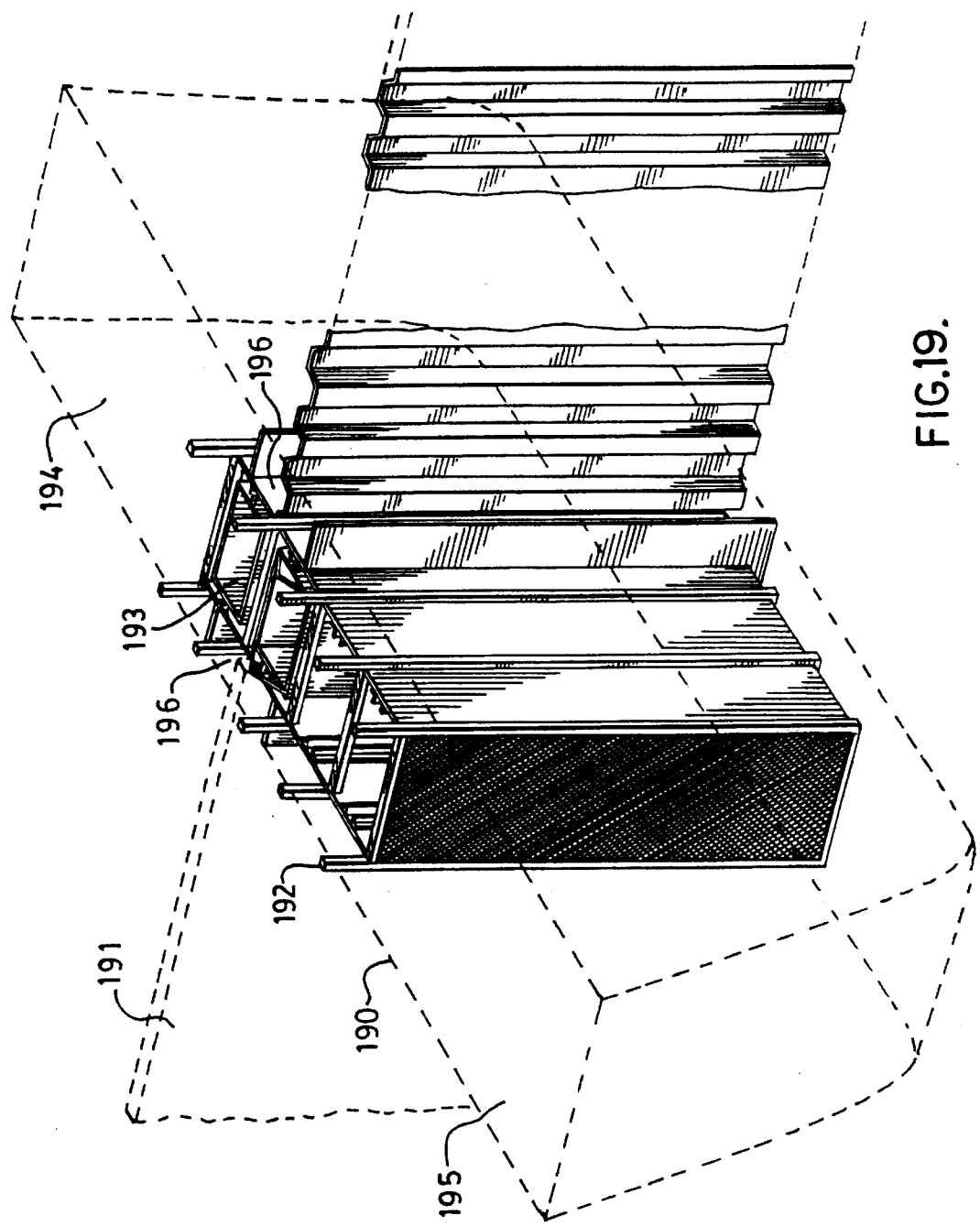
FIG. 19 is a pictorial view of a treatment system in which a receptacle is lowered into the ground, but which does not require the use of a withdrawable caisson.
Figure 20:
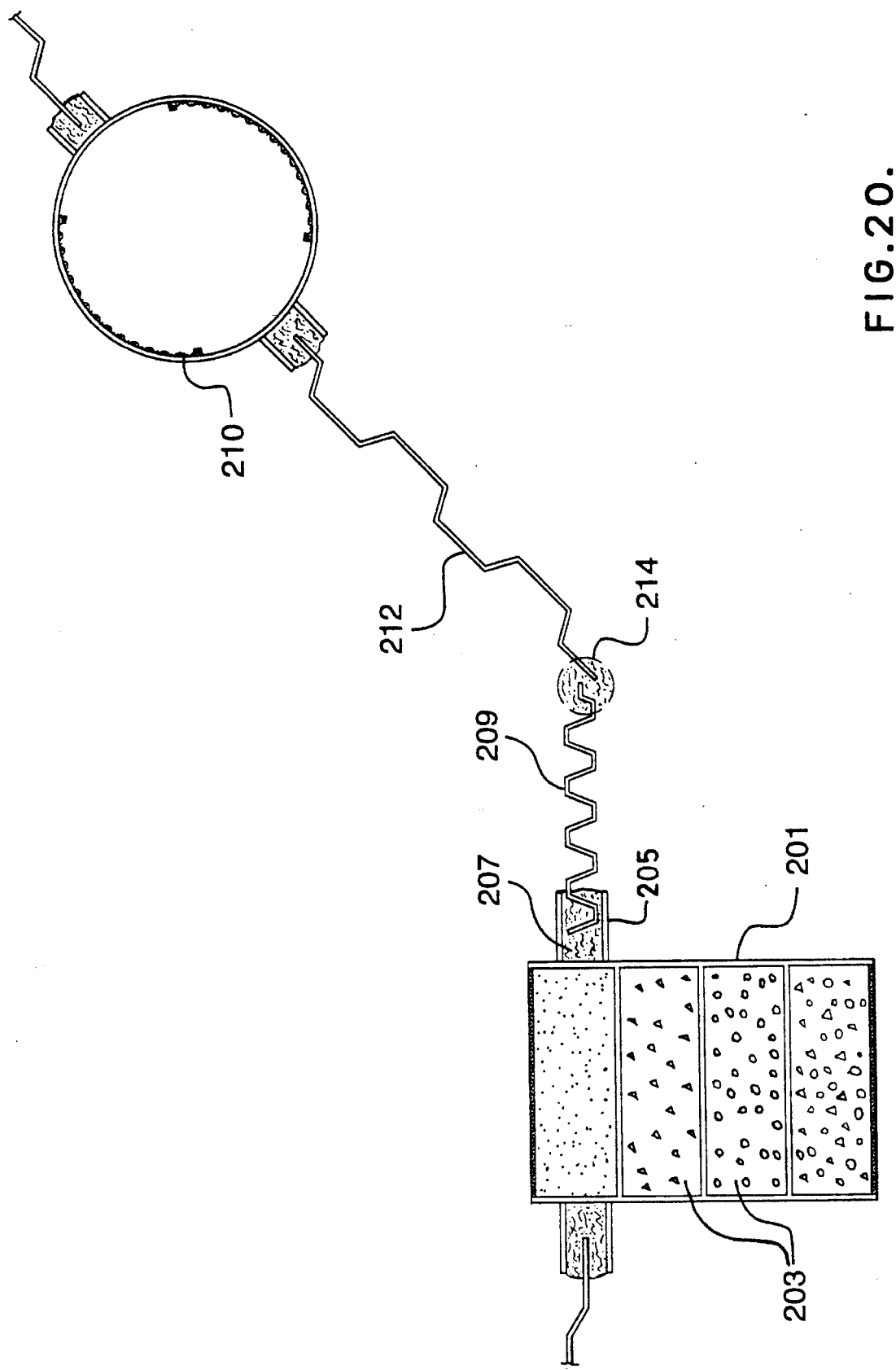
FIG. 20 is a plan view of a treatment system, showing another manner of construction.

FIG. 19 shows a way in which a receptacle can be lowered into the ground, without driving, even without the use of a caisson. In FIG. 19, a trench 190 is excavated along the line of the gate; that is to say, across the line of, and through, the wall 191. The trench 190 is filled with dissolvable mud, whereby the sides of the trench are kept from falling into the trench. The mud is, or becomes, soft enough that a receptacle 192 of metal, can be lowered into the mud, and the receptacle sinks down to the bottom of the trench. The various compartments defined by the receptacle are filled with the appropriate susbtances: ie the treatment material compartment 193 is filled with treatment material, the upstream and downsteam permeable compartments 194,195 are filled with sand/gavel or the like, and the side seal compartments 196 are filled with bentonite. These substances are inserted into the mud, the consistency of which is such that the substances sink into the mud. After a time, the mud disappears (by dissolving or degrading due to microbiological processes), leaving the substances present in the ground.

The waterproof wall 191 in FIG. 19 comprises sheet metal pilings, which are inserted so as to match up with the bentonite in the side seal compartments 196.

One of the benefits of the described side-seal compartment, filled with bentonite or other sealant, is that the compartment permits a high degree of mismatch tolerance between the receptacle and the wall. The compartment is created between the receptacle and the removable caisson, and filled with sealant while the caisson is in place. When the caisson is removed, the compartment is left open-sided. After that, the wall can then be installed, or completed; the engineer only has to see to it that the end of the wall is aligned with the open side of the compartment. The designer has the simple task of making sure the compartmnent is large enough to accommodate the possible mismatch between the body of sealant defined by the compartment and the end of the wall.

The term "aquifer" as used in this specification is intended in the broad sense to include any portion of ground that contains water, and through which the water may move. The term should not be understood to refer only to sand/gravel formations from which a water supply is drawn.

We claim:

1. System for in-situ treatment of contaminated groundwater in an aquifer, wherein:

the system is of the kind in which the contaminated groundwater moves through the aquifer due to in-ground pressure-head gradients;

the system includes a barrier or wall that extends down into the ground, the wall being placed in the path of the in-ground movement of the contaminated groundwater, the wall dividing an upstream portion of the aquifer from a downstream portion of the aquifer;

the wall is watertight, in the sense of being effective to substantially prevent the passage of groundwater through the wall;

the system includes at least one gap or gate in the wall;

the system includes a body of treatment material;

the body of treatment material is porous and permeable to the extent that groundwater can pass through the treatment material;

the treatment material is of such a chemical composition, in relation to the nature of the contaminant, that the contaminant in the water undergoes a chemical change, upon the water being passed through the treatment material;

the body is located in the ground, in the gate, and is so arranged that groundwater can pass from the upstream portion of the aquifer to the downstream portion of the aquifer through the treatment material;

the system includes a gate sealing means which is effective to prevent the passage of groundwater between the wall and the body of treatment material in the gate, whereby groundwater cannot pass from the upstream portion of the aquifer to the downstream portion of the aquifer except through the treatment material;

the arrangement and dimensions of the gate, the body of treatment material, and the sealing means are such, in relation to the velocity of flow of the groundwater, that even the shortest path through the treatment material from the upstream portion of the aquifer to the downstream portion of the aquifer is long enough to ensure a residence period of the contaminated water within the body of treatment material of sufficient time as to ensure the effective treatment of the contaminant.

2. System of claim 1, wherein the nature of the contaminant and of the treatment material are such that the chemical change arises as a microbiological reaction.

3. System of claim 1, wherein the said shortest path through the treatment material is at least 1.5 meters long.

4. System of claim 1, wherein the flow area of the gate, or, where the barrier contains more than one gate, the aggregate flow areas of all the gates, being the area presented to the upstream portion of the aquifer through which water can pass to the downstream portion of the aquifer, is substantially less than the area of the wall presented to the upstream portion of the aquifer;

whereby the groundwater, in flowing from the upstream portion of the aquifer to the downstream portion of the aquifer, is funnelled through the gate or gates.

5. System of claim 4, wherein the funnel-ratio of the system, being the ratio of the flow area of the gate or gates to the area of the wall, is less than one tenth.

6. System of claim 1, wherein, in relation to the magnitude of the flow of groundwater, and in relation to the water table in the aquifer, and in relation to the tolerated variations thereof, the size of the gate or gates is large enough to allow all the flow of water through the gates, and the system is extensive enough to contain all the contaminated groundwater.

7. System of claim 1, wherein the gate is a gate that was formed by a procedure which included the following steps:

driving a robust, metal, hollow, open-ended, withdrawable caisson into the ground, the caisson having an upstream sector of the caisson which, after driving, lies in contact with the upstream portion of the aquifer, and a downstream sector of the caisson which, after driving, lies in contact with the downstream portion of the aquifer, and having intercalated left and right sectors;

excavating and removing soil material from inside the caisson;

placing the body of treatment material inside the caisson;

and withdrawing the caisson from the ground.

8. System of claim 7, wherein:

the wall is a slurry wall, in that the wall was formed by the procedure of excavating a trench down into the ground from the surface, removing the excavated soil from the trench, keeping the trench constantly topped up with bentonite or like slurry material as the soil is removed from the trench, whereby the trench became filled with slurry, and the slurry served to keep the sides of the trench from caving into the trench;

and the gate is a gate in the slurry wall, and the gate divides the slurry wall into left and right portions thereof.

9. System of claim 8, wherein the procedure by which the gate was formed was such that:

after driving, the left and right sectors of the caisson lay in contact with the left and right portions of the slurry wall;

the caisson was withdrawn from the ground in such a manner that, after withdrawal:

an upstream sector of the body of treatment material, corresponding to the upstream sector of the caisson, lay in groundwater-communication with the upstream portion of the aquifer;

a downstream sector of the body of treatment material, corresponding to the downstream sector of the caisson, lay in groundwater-communication with the downstream portion of the aquifer;

and left and right sealing sectors of the body of treatment material, corresponding to the left and right sectors of the caisson, lay in such sealing contact with the left and right portions of the slurry wall as to prevent groundwater flow from the upstream portion of the aquifer to the downstream portion of the aquifer between the treatment material and the slurry wall.

10. System of claim 8, wherein left and right sealing sectors of the body of treatment material, corresponding to the left and right sealing sectors of the caisson, lie in such sealing contact with the left and right portions of the slurry wall that groundwater cannot flow from the upstream portion of the aquifer to the downstream portion of the aquifer between the treatment material and the slurry wall.

11. System of claim 1, wherein the treatment material at the gate is contained within a receptacle or container, which includes:

an upstream screen, through which an upstream sector of the body of treatment material lies in groundwater-communication with the upstream portion of the aquifer;

a downstream screen, through which a downstream sector of the body of treatment material lies in groundwater-communication with the downstream portion of the aquifer;

and the gate sealing means comprises left and right sealing sectors of the receptacle or container, which lie in such sealing contact with left and right portions of the wall as to prevent groundwater flow from the upstream portion of the aquifer to the downstream portion of the aquifer between the treatment material and the wall.

12. System of claim 11, wherein the system includes a sealed sector extending means, which is effective to extend the length of the sealed sector whereby the length of the shortest path between the upstream sector and the downstream sector, through the treatment material, is greater than the thickness of the watertight wall.

13. System of claim 11, wherein the gate is a gate that was formed by a procedure which included the following steps:

driving a robust, metal, hollow, open-ended, withdrawable caisson into the ground, the caisson having an upstream sector of the caisson which, after driving, lies in contact with the upstream portion of the aquifer, and a downstream sector of the caisson which, after driving, lies in contact with the downstream portion of the aquifer, and having intercalated left and right sectors;

then excavating and removing soil material from inside the caisson;

then lowering the receptacle down into the hollow interior of the caisson;

then placing the body of treatment material inside the receptacle;

then withdrawing the caisson from the ground.

14. System of claim 13, wherein the caisson was so formed that the upstream sector, the downstream sector, and the intercalated left and right side sectors, were in separate pieces, and the separate pieces were capable of being driven into the ground, and of being withdrawn from the ground, each separately from the other pieces, and wherein, upon withdrawing the caisson, only the upstream and downstream sectors were withdrawn, leaving the left and right side sectors remaining in the ground.

15. System of claim 14, wherein the system includes a seal which is effective to seal the receptacle to the remaining left and right side sectors of the caisson.

16. System of claim 14, wherein the gate sealing means is effective to seal the wall to the remaining left and right side sectors of the caisson.

17. System of claim 16, wherein:

the remaining left and right side sectors of the caisson sheet piling are of sheet piling elements, and the wall is of sheet piling elements;

the system includes interlocking means for interlocking respective elements of the wall with the left and right side sectors of the caisson;

and the gate sealing means comprises a means for sealing the interlock therebetween.

18. System of claim 13, wherein the gate sealing means is a gate sealing means that was formed by the procedure of:

so shaping the receptacle as to define, in relation to the caisson, left and right side seal compartments, the side seal compartments being located between the body of treatment material and the caisson, the arrangement being such that when the caisson was in place each compartment was a substantially complete enclosure, the periphery of which was defined partly by the material of the receptacle and partly by the material of the caisson;

excavating and removing soil material from the said left and right side seal compartments, and inserting sealant material into the said compartments;

withdrawing the caisson, whereby the portion of the periphery of the compartment that was defined by the caisson was withdrawn, leaving the compartment open-sided, and leaving the sealant remaining in the ground;

and inserting or forming the wall in such a manner and location that the wall extended into, and is sealed by, the said remaining sealant.

19. System of claim 18, wherein the receptacle is formed generally so as to define a treatment material compartment for containing the body of treatment material, and is formed with wings which extend outwards from that compartment, and wherein the said side seal compartments were defined by and between the caisson and the said wings.

20. System of claim 18, wherein the sealant is bentonite or bentonite slurry.

21. System of claim 18, wherein the sealant is gout or cement.

22. System of claim 11, wherein the gate is a gate that was formed by digging a trench at the gate through, and across the line of, the wall; inserting into the trench a dissolvable mud; and lowering the receptacle into the mud; whereby, when the mud later dissolved, the receptacle was left in the ground, at the gate.

* * * * *